United States Patent [19]
Fournier et al.

[11] Patent Number: 5,850,341
[45] Date of Patent: *Dec. 15, 1998

[54] METHOD AND APPARATUS FOR MONITORING MATERIAL REMOVAL USING MOBILE MACHINERY

[75] Inventors: Richard J. Fournier, Bartonville; Doug S. Gordon, Glasford; Adam J. Gudat, Edelstein; Gregory R. Harrod, Peoria; Daniel E. Henderson, Washington; Karl W. Kleimenhagen; William C. Sahm, both of Peoria; Charles L. Schaidle, Metamora; Ken R. Setterlund; Ron J. Siroky, both of Peoria, all of Ill.

[73] Assignee: Caterpillar Inc., Peoria, Ill.

[*] Notice: The terminal 17 months of this patent has been disclaimed.

[*] Notice: The term of this patent shall not extend beyond the expiration date of Pat. No. 5,404,661.

[21] Appl. No.: 241,305

[22] Filed: Jun. 30, 1994

[51] Int. Cl.⁶ .................................................. E21B 21/06
[52] U.S. Cl. .............................. 364/424.07; 364/424.04; 364/449; 364/DIG. 1; 37/347; 37/348; 342/147; 342/173; 342/357
[58] Field of Search ............................. 364/424.07, 508, 364/509, 167.01, 424.04, DIG. 1; 37/348, 347; 444/699; 342/357, 147, 173

[56] References Cited

U.S. PATENT DOCUMENTS

| | | | |
|---|---|---|---|
| 4,026,423 | 5/1977 | Schade et al. | 214/10 |
| 4,633,383 | 12/1986 | Omachi et al. | 364/167 |
| 4,677,555 | 6/1987 | Goyet | 364/424 |
| 4,698,775 | 10/1987 | Koch et al. | 364/478 |
| 4,785,761 | 11/1988 | Greenbank | 118/682 |
| 4,807,131 | 2/1989 | Clegg | 364/424.01 |
| 4,807,136 | 2/1989 | Rutkowski et al. | 364/424.07 |
| 4,820,041 | 4/1989 | Davidson et al. | 356/1 |
| 4,831,539 | 5/1989 | Hagenbuch | 364/449 |
| 4,833,615 | 5/1989 | Bitner et al. | 364/463 |
| 4,903,212 | 2/1990 | Yokouchi et al. | 364/449 |
| 4,919,222 | 4/1990 | Kyrtsos et al. | 177/139 |
| 4,949,263 | 8/1990 | Jurca | 364/424.07 |
| 5,019,983 | 5/1991 | Schutten et al. | 364/424.07 |
| 5,065,326 | 11/1991 | Sahm | 364/424.07 |
| 5,100,229 | 3/1992 | Lundberg et al. | 356/4 |
| 5,113,349 | 5/1992 | Nakamura et al. | 364/478 |
| 5,257,177 | 10/1993 | Bach et al. | 364/167.01 |
| 5,295,317 | 3/1994 | Perrott | 37/348 |
| 5,321,637 | 6/1994 | Anderson et al. | 364/567 |
| 5,404,661 | 4/1995 | Sahm et al. | 37/348 |

OTHER PUBLICATIONS

U.S. Asn. 08/164,171 Filed Dec. 8, 1993.
U.S. Asn. 08/165,126 Filed Dec. 8, 1993.
U.S. Asn. 08/228,337 Filed Aug. 18, 1994.
Caterpillar Special Instruction Operating Manual—Wheel Loader Payload Measuring System (pp. 1 through 27) (Preliminary Inf.).

*Primary Examiner*—Kevin J. Teska
*Assistant Examiner*—Thai Phan
*Attorney, Agent, or Firm*—Alan J. Hickman; James R. Yee

[57] ABSTRACT

A method and apparatus for monitoring in real time the removal of material from a land site such as a mine by a mobile machine. A digitized three-dimensional model of the site is stored in a digital data storage and retrieval facility. The site model includes a model of the material to be removed subdivided into regions of differentiating characteristics, for example ore grade or type. The machine is provided with means for generating digital signals representing in real time the instantaneous position in three-dimensional space of at least a portion of the machine as it traverses the site. Loading signals are generated corresponding to the removal of material from the site by the machine, and an instantaneous loading position for the mobile machine relative to the site is recorded in response to the loading signal. The invention preferably includes a payload measurement system which measures each discrete load of material removed. The characteristics of the site material at the recorded loading position are correlated to the material removed from the site. In a preferred form a dynamic site database is used to update the site as material is removed and direct the machinery in altering the site to a desired state.

66 Claims, 17 Drawing Sheets

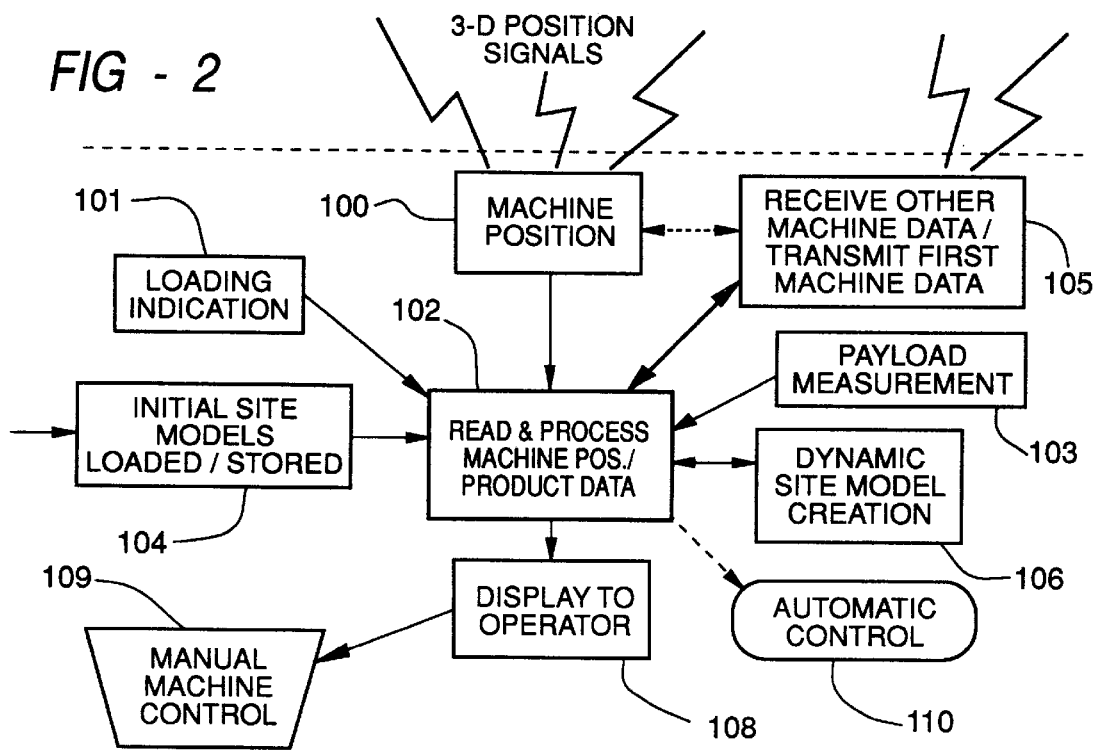
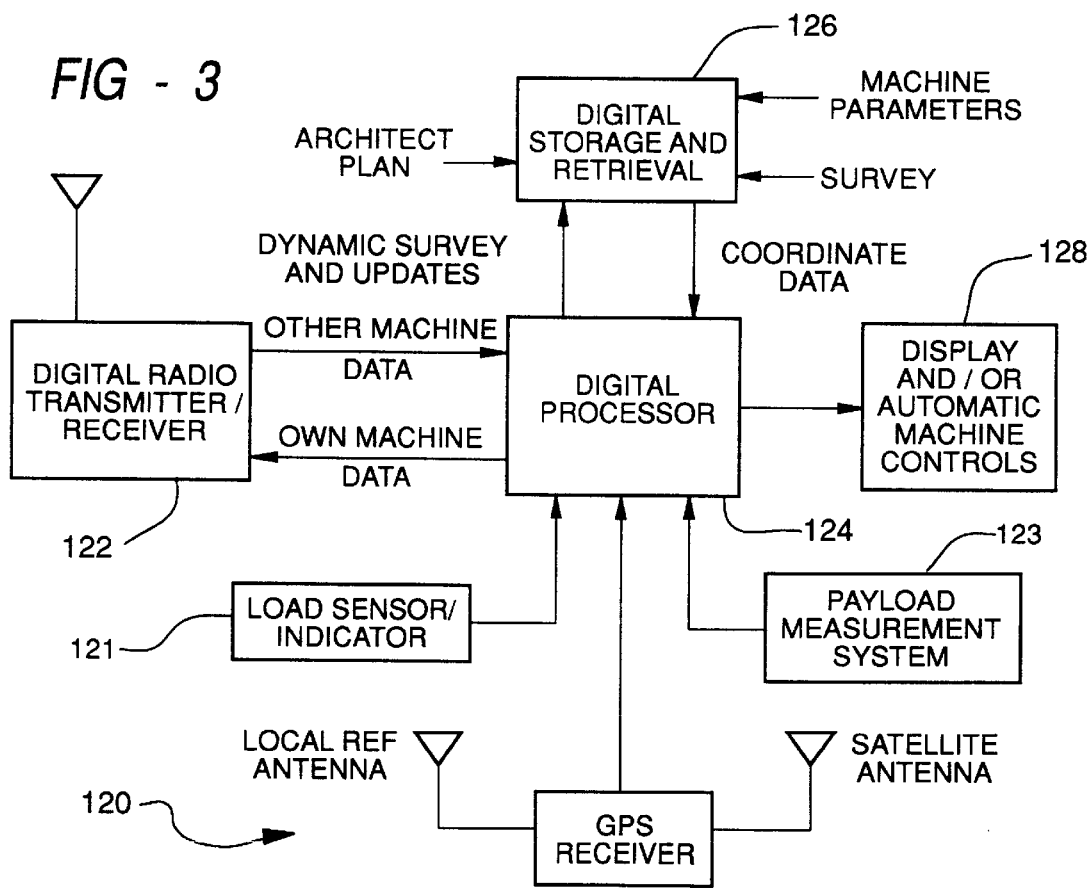

| TIME | X | Y | ORE | | |
|---|---|---|---|---|---|
| 09:00:00:00 | 100 | 200 | .04 | A | LOAD (CLEAN) |
| 09:00:15.00 | 75 | 175 | .04 | B | DUMP (CLEAN) |
| 09:00:30.00 | 105 | 210 | .03 | C | LOAD #1 |
| 09:00:45.00 | 80 | 180 | .04 | D | DUMP |
| 09:01:00.00 | 109 | 206 | .04 | E | LOAD #2 |
| 09:01:15.00 | 70 | 170 | .04 | F | DUMP |
| 09:01:30.00 | 110 | 205 | .04 | G | |
| 09:01:35.00 | 115 | 200 | .04 | H | LOAD #3 |
| 09:01:50.00 | 75 | 175 | .04 | I | DUMP |
| 09:02:05.00 | 100 | 200 | .04 | J | LOAD #4 |
| 09:02:20.00 | 80 | 180 | .04 | K | DUMP |
| | | | BUCKET | PAY LD | |
| | | | #1 | 10.1 | |
| | | | #2 | 11.2 | |
| | | | #3 | 12.4 | |
| | | | #4 | 9.8 | |
| 09:02:22.00 | | | | | |

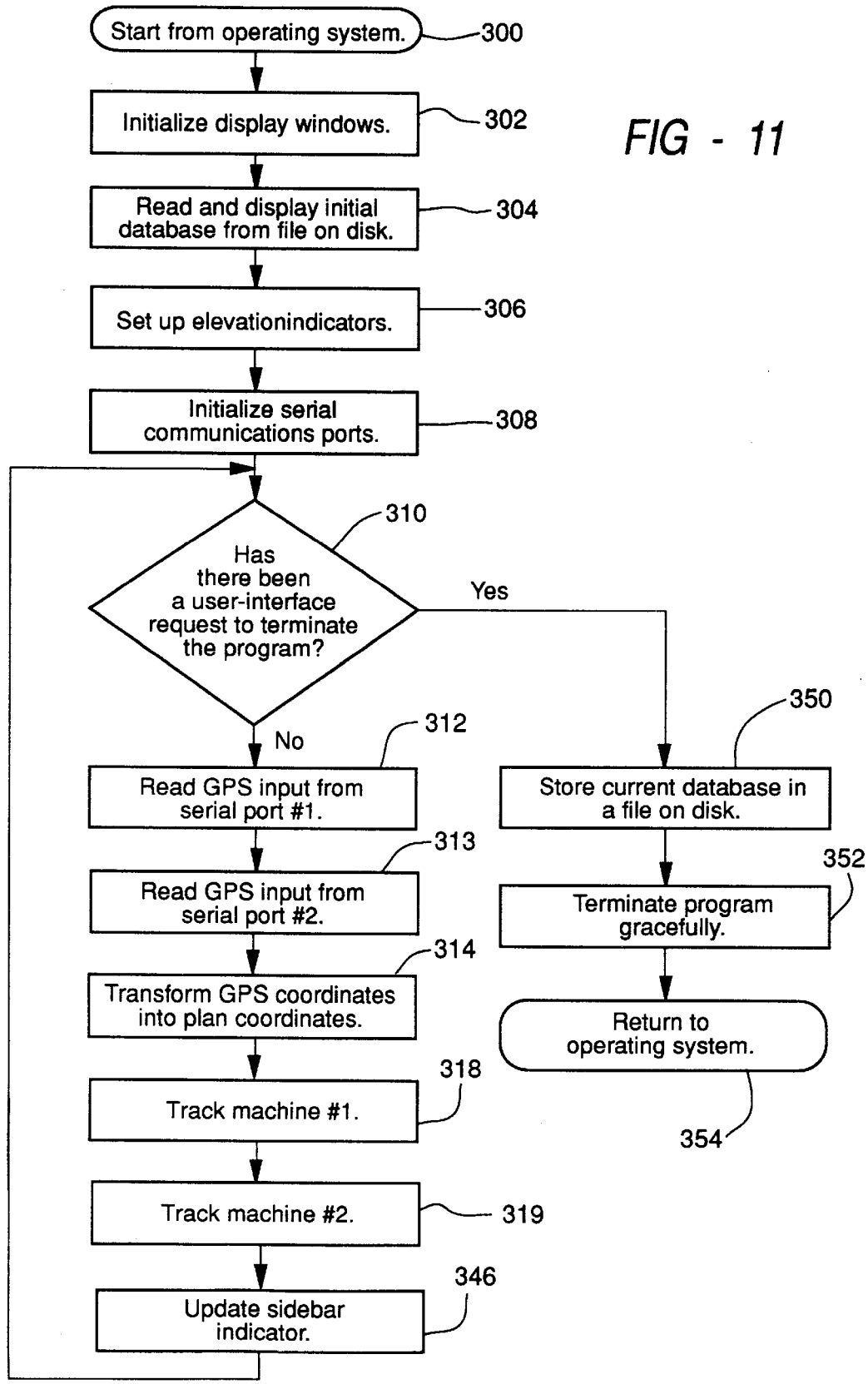

```
SAMPLE REVERSE_SWITCH
SAMPLE NEUTRAL_SWITCH

IF    REVERSE_SWITCH   = 0 AND NEUTRAL_SWITCH = 0
THEN  FORWARD_STATE = 1
ELSE  FORWARD_STATE = 0

IF    FORWARD_STATE    = 1 OR (IF FORWARD_STATE = 0 AND LAST FORWARD_REGISTER = 1 AND LAST REVERSE_SWITCH = 0)
THEN FORWARD_REGISTER = 1

ELSE FORWARD_REGISTER = 0

IF    FORWARD_REGISTER  = 1 AND REVERSE_SWITCH = 1
THEN    FOR_REV SHIFT  = 1
     SAMPLE (TIME, X,Y)
ELSE   FOR_REV_SHIFT = 0

LAST_FORWARD_REGISTER = FORWARD_REGISTER

LAST_REVERSE_SWITCH   =   REVERSE_SWITCH
RETURN
```

|         | REVERSE SWITCH | NEUTRAL SWITCH |
|---------|----------------|----------------|
| FORWARD | 0              | 0              |
| NEUTRAL | 0              | 8V             |
| REVERSE | 24V            | 0              |

|  | DATA REV. SW. | DATA NEU. SW. | INTERM CALC FOR. STATE | INTERM CALC FOR. REGISTR | OUTPUT F/R SHIFT | TIME | X LOC | Y LOC | ORE GRD. | COMMENT | |
|---|---|---|---|---|---|---|---|---|---|---|---|
| INIT. | 0 | 1 | 0 | 0 | 0 | | | | | | |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:00:00 | 100 | 200 | .04 | CLEAN | A |
| NEU. | 0 | 1 | 0 | 0 | 0 | | | | | | |
| REV. | 1 | 0 | 0 | 0 | 0 | | | | | | |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:00:15 | 75 | 175 | .04 | CLEAN | B |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 0 | 1 | 09:00:30 | 105 | 210 | .03 | LOAD | C |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:00:45 | 80 | 180 | .04 | DUMP | D |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |

FIG - 13A

| | DATA REV. SW. | DATA NEU. SW. | INTERM CALC FOR. STATE | INTERM CALC FOR. REGISTR | OUTPUT F/R SHIFT | TIME | X LOC | Y LOC | ORE GRD. | COM-MENT | |
|---|---|---|---|---|---|---|---|---|---|---|---|
| REV. | 1 | 0 | 0 | 1 | 1 | 09:01:00 | 109 | 206 | .04 | LOAD | E |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:01:15 | 70 | 170 | .04 | DUMP | F |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:01:30 | 110 | 205 | | LOAD | G |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:01:35 | 115 | 200 | .04 | LOAD | H |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:01:50 | 75 | 175 | .04 | DUMP | I |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:02:05 | 100 | 200 | .04 | LOAD | J |
| NEU. | 0 | 1 | 0 | 0 | 0 | | | | | | |
| FOR. | 0 | 0 | 1 | 1 | 0 | | | | | | |
| NEU. | 0 | 1 | 0 | 1 | 0 | | | | | | |
| REV. | 1 | 0 | 0 | 1 | 1 | 09:02:20 | 80 | 180 | .04 | DUMP | K |

FIG - 13B

METHOD AND APPARATUS FOR MONITORING MATERIAL REMOVAL USING MOBILE MACHINERY

TECHNICAL FIELD

This invention relates to the operation of mobile machinery for removing material from a work site and, more particularly, to the real time generation and use of digital data which represents the geography of the work site, the position of the machine as it traverses the site, and the site material as it is removed by the mobile machinery.

As used in this patent specification the phrase "mobile machinery" and various approximations thereof refer to self-propelled mobile machines such as loaders, tractors and shovels which exhibit both (1) mobility over or through a work site as a result of being provided with a prime mover (for example an engine) on a frame which drives wheels or tracks supporting the frame, and (2) the capacity to remove material from the site as a consequence of the provision on the frame of a tool or tool set such as a bucket, shovel, blade or the like.

BACKGROUND OF THE INVENTION

The process of removing material from land sites such as mines has been aided in recent years by the development of commercially available computer software for creating digital models of the geography or topography of a site. These computerized site models can be created from site data gathered by conventional surveying, aerial photography, or, more recently, kinematic GPS surveying techniques. Using the data gathered in the survey, for example point-by-point three-dimensional position coordinates, a digital database of site information is created which can be displayed in two or three dimensions using known computer graphics or design software.

For material removal operations such as mining it is desirable to add additional information to this database. Core samples are frequently taken over a site in order to categorize and map the different types and locations of material such as ore, as well as the different concentrations or grades within a given ore type. Other useful information includes property boundaries, not only of the mine itself, but possibly internal boundaries such as parcels of the mine which may belong to individual groups of investors.

Using the above information, a mine plan can be developed. The mine plan can include an evaluation of the amount of topsoil to remove and stockpile or spread for reclamation, and identification of the amount of overburden required to be moved in order to mine the ore. Finally, the plan may include the method with which the actual ore will be mined and removed.

The economy of the mining operation is largely determined by the amount of product processed from the ore removed. To meet output requirements, identification of economical ore concentrations to be processed is important. It is therefore desirable to establish well defined boundaries for the various types and grades of ore to be mined from the site which can be efficiently processed with current methods. A frequent practice is to expand these boundaries to excavate additional material to ensure that all high grade ore is extracted. This additional material is referred to as "dilution." A decrease in dilution can result in a direct increase in profit for the mine.

Using a computerized site model with the above information, the mine manager identifies the material to be mined. Generally a paper copy map of the site and the material to be mined is generated with boundaries corresponding to the different types and grades of ore. Surveying and stake setting crews, often working full time, mark the site itself with corresponding flags or stakes. The computerized site model and the surveying and stake setting must periodically be updated to reflect progress on the site.

The mining of the ore is accomplished with mobile or semi-mobile loading machinery equipped with a tool such as a bucket or shovel. The loader removes the ore as indicated by the stakes or flags and loads it one bucket or shovel at a time into an off-highway truck, for example. When the truck is filled, the truckload of ore is transported from the site for processing or stockpiling.

During the loading operation the flags or stakes marking out the various types and grades of ore are vulnerable and are easily disturbed. It may also be difficult for the operator to see the flags, depending on the available light or weather. Additionally, there may be several marked sections that look similar to the mapped area which the operator is trying to locate from the paper copy of the site model. The problem is aggravated by the growing use of highly mobile loading tools such as wheel-type ore loaders. The more mobile the loading tool, the more difficult it is for the site manager to monitor its location and operation.

Since mines are typically set up to handle a given amount of material of given ore concentrations, errors in loading the wrong material from the site can be costly. If a mine inadvertently provides a mill or processing plant with material that is out of specification regarding the concentration of ore, the mine may be liable for compensating the plant for any related production consequences.

As further background, Caterpillar Inc. has developed real time methods and apparatus for monitoring and updating the position and progress of geography-altering machinery on a site. A dynamically updated site database is provided with real time, three-dimensional position information for the machinery, for example point-by-point coordinates determined with kinematic GPS positioning. The position information can be used to determine the difference between actual and desired site models to help the machinery operators monitor and control geography altering operations such as earth moving or compaction. Co-pending U.S. patent application Ser. No. 08/165,126 filed Dec. 8, 1993 illustrates a method and apparatus for earth contouring operations. Co-pending U.S. patent application Ser. No. 08/164,171 filed Dec. 8, 1993 illustrates a method and apparatus for compacting operations.

Caterpillar Inc. has also developed a real time method and apparatus for coordinating the operations of multiple geography-altering machines on a work site using a common, dynamically updated site database. Real time position information from two or more machines is shared, for example by digital radio datalink, to create a common site database showing the real time position and progress of the machines as they operate on the site. Co-pending U.S. patent application Ser. No. 08/228837 filed Apr. 18, 1994 illustrates such a system.

SUMMARY DISCLOSURE OF THE INVENTION

In general the present invention is achieved with an apparatus and method for monitoring in real time the removal of material from a land site by a mobile machine. Digital data storage and retrieval means are provided for storing a three-dimensional site model, which includes a model of the material to be removed subdivided into regions of differentiating characteristics. Positioning means generate digital signals representing in real time the instantaneous position in three-dimensional space of at least a portion of the machine as it traverses the site, and load sensing means sense the removal of material from the site by the mobile machine to generate a corresponding loading signal or data tag. An instantaneous loading position for the mobile machine relative to the site is determined in response to the loading signal or data tag.

According to another aspect of the invention, means are provided for correlating the characteristics of the site material at the instantaneous loading position to the material removed by the machine. The invention can also include an apparatus and method for measuring a discrete load of material as it is removed from the site, for example by weight, and for correlating the measured load to the instantaneous loading position. The invention preferably includes means and a method for recording a plurality of loading positions corresponding to a plurality of discrete loads of material removed from the site comprising a payload, and for determining an average loading position for the payload, total payload measurement such as total weight, and/or the average characteristics of the material comprising the payload.

Sensing the removal of material from the site in one form is accomplished by sensing a change of direction of the mobile machine, for example with a transmission shift sensor which provides a signal to indicate the end of a loading or dumping phase when the transmission is shifted.

The means for generating position signals is preferably carried on the machine, in one form comprising a GPS receiver for generating three-dimensional GPS (x,y,z,time) coordinates using kinematic GPS positioning. Where the machine includes an operative tool such as a bucket or shovel which is movable relative to the machine, the positioning means can be located on the tool for increased accuracy in pinpointing the removal of material from the site.

According to another aspect of the invention, means are provided for receiving the thee-dimensional position signals and for displaying the position of the machine relative to the site in real time. The display means in one form are located on the machine as a convenient operator display.

The invention can also include an apparatus and method for updating the site model in response to the position signals to reflect site alterations, for example material removed by the machine. This can be accomplished using algorithms in the database to track the real time position and path of the machine as it moves over the site and to update the site model in response to changes measured by the positioning means on the machine.

In a further embodiment the site model can include a first site model representing the desired geography of the site (or a portion thereof) and a second site model representing the actual geography of the site.

The database further includes means and a method for determining the difference between the first and second site models in real time and for generating signals for directing the operation of the machine in accordance with the difference to bring the second model into conformity with the first model. For example, these signals may be used to generate an operator display visually indicating the difference between the first and second models.

The inventive apparatus and method can be used in conjunction with transport means such as a truck which receives the material removed from the site by the mobile machine for hauling to a remote location. In this instance means for correlating the material removed from the site to the transport means can be provided.

In a further form the invention comprises an apparatus and method for storing a site model in digital data storage and retrieval means, the site model including a model of the material to be removed subdivided into regions of differentiating characteristics; for generating digital signals representing in real time the instantaneous position in three-dimensional space of at least a portion of the mobile machine relative to the site; for sensing the removal of discrete load of material from the site by the mobile machine and for generating a corresponding loading signal; for recording an instantaneous loading position for the mobile machine relative to the site in response to the loading signal; and for measuring the discrete load of material removed and for correlating the measured load to the instantaneous loading position and the characteristics of the site material at the instantaneous loading position.

In one embodiment the means for measuring the discrete load of material removed and for correlating the measured load to the instantaneous loading position are located on the machine. Means are provided for transmitting the load position and measurement information off the machine.

The invention may further include an apparatus and method for recording a plurality of loading positions corresponding to a plurality of the discrete loads of material removed from the site comprising a payload, and for determining the average loading position for the material in the payload. Additionally, or alternately, the invention can include a payload measurement system for measuring the weight of a plurality of discrete loads of material removed from the site comprising a payload, and for determining an average for the material characteristics of the payload based on the material characteristics for each discrete load.

The inventive apparatus and method in one illustrative embodiment is employed in conjunction with a mobile, wheel-type ore loader having a loading bucket. The invention may also be used with other material-removing machines, for example cable shovels or earth-contouring machinery.

These and other features of the invention will become apparent upon further reading of the specification.

BRIEF DESCRIPTION OF THE DRAWINGS

FIG. 2 is a schematic representation of a method for monitoring material removal according to the present invention;

FIG. 3 is a schematic representation of an apparatus for monitoring material removal which can be used in connection with the receipt and processing of GPS signals to carry out the present invention;

FIG. 4A is a schematic representation of the payload measurement system of FIG. 4;

FIG. 11 is an alternate method according to FIGS. 10A–10D for a common dynamic database for multiple machines; and FIGS. 12–14 schematically represent a method for generating a loading indicator signal based on the direction of travel of the machine for the operation illustrated in FIG. 1.

BEST MODE FOR CARRYING OUT THE INVENTION

Figure 1:
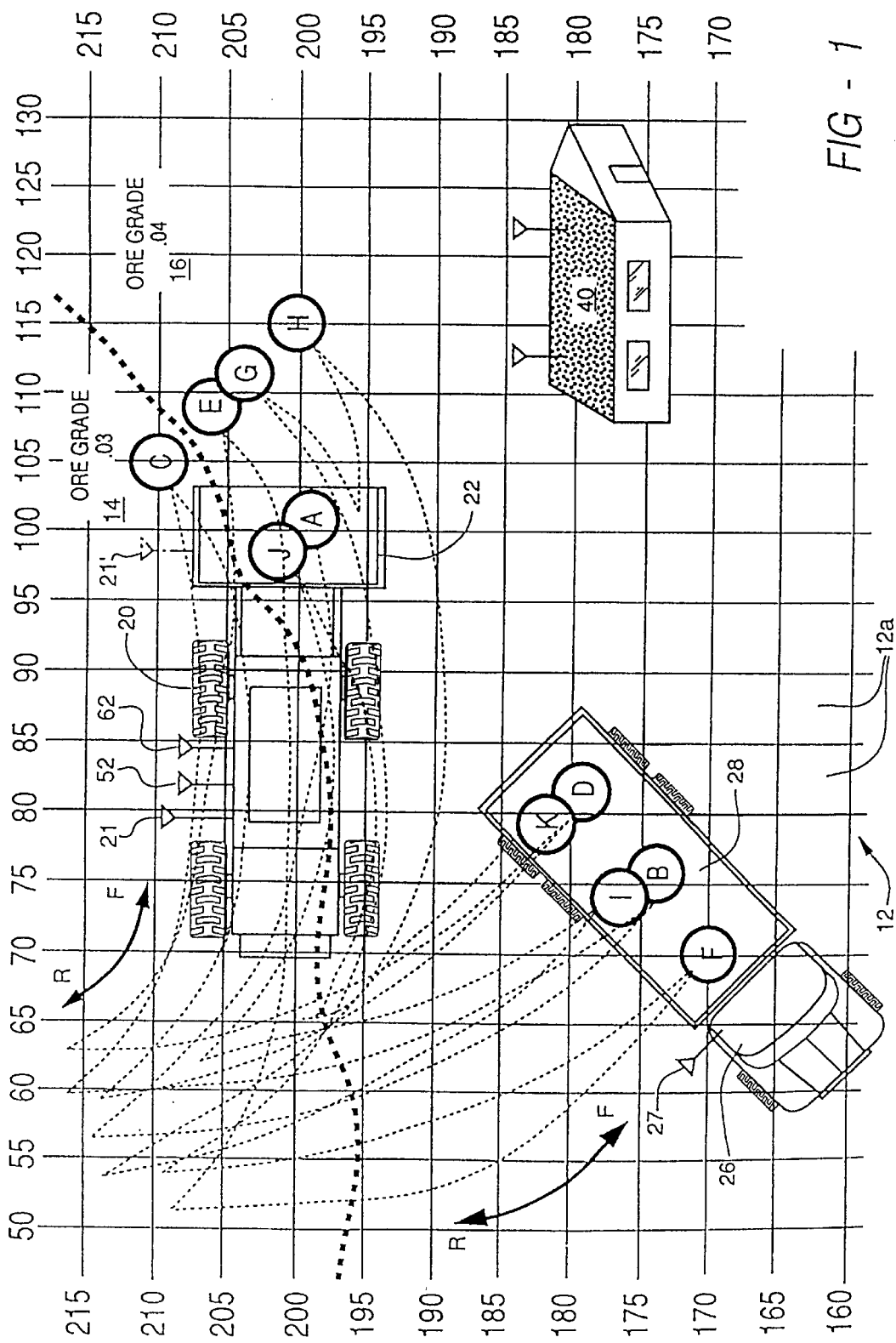
FIG. 1 is a schematic plan view of a mine work site in which the present invention is applied using a wheel-type ore loader and a payload truck.

Referring to FIG. 1, a mine work site 12 is schematically illustrated in plan view, subdivided into unit areas or grid cells 12a according to a digitized, three-dimensional site model. The site model can be created in known fashion using commercially available computer software. For example, the topography/geography of land site 12 can be determined on a point-by-point basis with conventional optical surveying or kinematic GPS surveying techniques. The (x,y,z) coordinate points (easting, norfing, elevation) are used to generate a two- or three-dimensional computerized map of the site, overlaid with a reference grid of uniform grid elements 12a in known fashion.

Site 12 in FIG. 1 is further differentiated into ore type or grade regions 14,16 in known fashion. Core samples taken over the site can be used to categorize and map the different types and locations of ore, as well as the different concentrations or grades within a given ore type, and are added to the digitized site model. In FIG. 1 region 14 represents an ore grade of 0.03; region 16 represents an ore grade of 0.04. Alternately, or additionally, the digitized site model can be differentiated into different ore types, for example where two different mineral ores are present on a single site. For simplicity of explanation in this illustrated embodiment, however, site 12 is simply differentiated into ore grades.

A wheel-type loader 20 is schematically illustrated with a front end "bucket" 22 used to excavate and remove bucketloads of ore from the site. Wheel-type and other mobile ore loaders are well known and are commercially available, for example from Caterpillar Inc.

The ore material removed by wheel loader 20 is transferred to a nearby transport truck 26. The loading and transfer of ore from loader 20 to truck 26 in FIG. 1 is accomplished in standard fashion: loader 20 moves forward to excavate a load of ore material with bucket 22. The loader operator next shifts the transmission from forward through neutral into reverse and withdraws with a bucketload of ore. Shifting back (reverse-neutral-forward), loader 20 moves forward in the direction of truck 26 to position bucket 22 over the payload bin 28. Bucket 22 is raised in known fashion and the bucketload of ore is dumped into the truck 26. The operator then shifts forward-neutral-reverse, withdrawing from truck 26. With a final transmission shift reverse-neutral-forward the loader proceeds forward again in the direction of the ore pile to remove another bucketload of ore. This process is repeated until truck 26 has been loaded to the desired degree, for example with four bucketloads. Truck 26 then transports this truckload of ore to a suitable processing or stockpile location according to the mine plan or instructions from a mine manager. Sensing or determining the removal of material from the site may be accomplished by any one of several methods. In one form, this is accomplished by sensing the change of direction of the mobile machine, for example with a transmission shift sensor which provides a signal to indicate the shift from forward to reverse. Because maximum efficiency between a loading machine putting material into a hauling unit is achieved by establishing very repeatable cycles, monitoring forward to reverse shifts allows a method of correlating a pay load measurement to a location within the ore body or bank from which a bucket load of material was obtained. For example, a loading machine operator may drive into a bank of ore in the forward gear. Once the bucket is adequately loaded the operator will shift from forward into reverse.

In accordance with the present invention, wheel loader 20 in FIG. 1 is equipped with three-dimensional position information apparatus 21, for example a GPS receiver. Primary position signals are received at 21 from the GPS satellite constellation orbiting the Earth. Machine 20 is also equipped with an antenna 52 for receiving a differential/correction GPS signal from base reference station 40 located at or near site 12. Machine 20 can be further equipped with two-way digital communications apparatus 62 for transmitting and receiving digital data to and from other similarly equipped loaders, truck 26 equipped with two-way radio 27, and/or base reference station 40.

In the illustrated embodiment of FIG. 1 loader 20 is further equipped with a dynamically updated site database (illustrated in subsequent figures). The site database includes a digitized site model as described above stored in accessible memory, and algorithms for dynamically updating the site model in real time to reflect the position of machine 20 relative to the site and corresponding changes in the site topography. The dynamic database generates signals representing machine position and the updated site model, which signals can be used to direct the operation of machine 20, for example with a real time operator display.

In the present invention a GPS (x,y,z,time) coordinate position reading is taken for each bucketload of ore material removed from the site, corresponding to the position of bucket 22 when the ore is removed. GPS receiver 21 is positioned on loader 20 in such a manner that the coordinate point reading corresponds to the position of bucket 22. For example, the GPS receiver may be located on the cab of the loader a fixed distance from the (x,y,z) position of bucket 22, and the GPS position coordinates offset accordingly. Although the x and y coordinate positions of the bucket load of material is used to determine the ore grade, it is recognized that for a well mapped ore body having differing concentrations of ore accessible by a loading tool the x, y and z coordinate positions could be used to determine the ore grade. The z coordinate may be obtained by determining the coordinate of the receiver 21 on the machine body and combining this information with information obtained from the lift arm position such as determined by sensor 65d. The Alternately, the GPS receiver can be positioned directly on bucket 22 as shown in phantom at 21' for additional position information and to avoid time lag between GPS coordinate points and the actual position of bucket 22 as the loader moves over the site.

As shown in the drawing, wheel loader 20 has taken bucketloads of ore material at points A, C, E, H and J and has transferred them to truck 2G at B, D, F, I, and K, respectively. Points A, E, H and J represent ore taken from the 0.04 ore grade region, while point C represents a bucketload of ore material taken from the 0.03 ore grade region of the site.

Referring now to FIG. 2, the method of the present invention is shown schematically. Using a known three-dimensional positioning system with an external reference, for example (but not limited to) 3-D laser, GPS, GPS/laser combinations or UHF/VHF radio, machine position coordinates are determined in block 100 as the machine moves over the site. These coordinates are instantaneously supplied as a series of discrete points to a dynamic database which reads and processes the machine position information at 102. A differencing algorithm calculates the machine position/path and site updates in real time. Digitized models of the site topography/geography are loaded or stored at 104, for example an accessible digital storage and retrieval facility such as a local digital computer. The dynamic database at 102 retrieves, manipulates and updates the site model(s) from 104 and generates at 106 a dynamic site database which is updated in real time as new position information is received from block 100. This dynamically updated site model is made available to the operator at display step 108, providing real time machine position, production data and site updates in human readable form. Using the information from the display the operator can efficiently monitor and direct the manual control of the loading machine at 109.

In a preferred form the dynamic database at 102 not only monitors the machine position and path in real time, but also determines the difference between the actual site and desired site model, updating the actual site model in real time as new position information is received. For example, where the machine must maintain the mining "bench" or work surface in addition to removing ore material, the difference between the actual and desired site topography/geography is updated in real time as the bench material is removed or recontoured by the machine.

In the present invention the algorithms in the database at 102 additionally read and process the machine position coordinates when a load indication signal is received from block 101. In the illustrated embodiment a shift of the machine transmission into reverse in preparation for transferring a just-removed bucketload of ore to a transport truck generates a signal received at 102 to record the corresponding machine position coordinate information received from block 100. The recorded loading coordinates are then correlated to payload measurement information received from block 103.

Payload measurement information, for example the weight of a bucketload of ore taken by the loading machine, is determined at step 103 using a known payload measurement system. Such systems for wheel loaders are commercially available from Caterpillar Inc., employing a microprocessor and sensors for measuring lift cylinder pressure and lift angle. The payload measurement system calculates the weight of each bucketload of ore as it is raised for dumping into the truck, stores the measurements for the individual bucketloads, and additionally maintains a running sum of the weight of successive bucketloads. When the truck is filled to the desired degree, for example with four bucketloads, the operator hits a "store" button to designate a truck payload and zero the bucketload count. In FIG. 2 the payload measurement system provides the bucketload and truckload information to the database at 102. This is correlated to the previous loading position coordinate points recorded in response to the signal from step 101 to identify the precise location from which the ore material was excavated. Because the database contains ore grade information for the site model at each of the coordinate points, a descriptive summary of information per truckload of material can be created. This allows efficient distribution of the truck payload by the truck operator or mine manager, and provides a detailed record of production data.

Still referring to FIG. 2, in a preferred form the machine position and production data update information generated by the database can be transmitted to the truck, other loading machines, and/or an off site mine manager database using a digital communication link at 105. Additionally, machine position, site update and production data information from other machines can be received at 105 and used to update the database at 102,106 to create a common database as described in further detail in co-pending U.S. application Ser. No. 08/228837, filed Apr. 18, 1994, the disclosure of which is incorporated herein by reference.

In general, the creation of a common, dynamically-updated site database is achieved when machine position information, for example 3-D coordinate points in an (x, y, z) coordinate system, is received from a second machine by a suitable data transmission link. Multiple machine position and product data information from steps 100, 101, 103 and step 105 is delivered to the database at 102, where the resident algorithms calculate the position, path and production data of both machines in real time and update the site database at 106 accordingly. The resulting database is displayed to the operator at 108 and shows the positions of both machines on the site, the alterations to the site made by each machine, and the production data for each machine.

Referring now to FIG. 3, an apparatus which can be used in connection with the receipt and processing of GPS signals to carry out the present invention is shown in block diagram form comprising a GPS receiver apparatus 120 with a local reference antenna and a satellite antenna for generating position information for a machine; a digital processor 124 employing machine position and production data algorithms, connected to receive position information from receiver 120; a digital storage and retrieval facility 126 accessed and updated by processor 124, and an operator display and/or automatic machine controls at 128 receiving signals from processor 124. GPS receiver 120, processor 124, digital storage device 126, and display 128 may be used to create and display to the operator a dynamically-updated site database with real time updates for the position and site alterations effected by the machine. The creation of such dynamic databases for earth-contouring and compacting operations, for example, is described in co-pending applications U.S. Ser. Nos. 08/165,126 and 08/164,171, both filed Dec. 8, 1993 and co-owned by the assignee of the present application.

The system further includes a load sensing indicator 121 which generates and delivers a signal to processor 124 to match GPS position coordinates to the excavation of a bucketload of ore material. As described below in further detail, this signal may be generated in response to a machine transmission shift indicating that a bucketload of material has been excavated, for example a shift from forward through neutral into reverse in preparation for transporting and loading the material to a waiting truck. This transition from forward to reverse produces a signal from the load sensor indicator 121 which indicates the time at which the x, y, and z locations of the loading tool are to be stored. Since the transition from forward to reverse may occur at various points in the operating cycle, such as when the loader operator has dumped the material into the hauling unit, it is necessary to determine the location at which the load has been acquired. This can achieved for example, by correlating the forward-reverse shifts with the location(s) of the material, by sensing lift cylinder pressure, or by the operator's input through any suitable operator interface. A payload measurement system 123 is connected to and supplies information to processor 124 in the form of bucketload and truck payload data such as weight. As noted above, payload measurement system 123 may be a known, commercially available system such as made by Caterpillar Inc.

A digital radio transmitter/receiver 122 can be provided for receiving and transmitting position and production data information to and from other machines, the truck, and/or another database supervised by a mine manager.

The system of FIG. 3 precisely monitors the point on the site where each bucketload of ore or other site material is removed, and records and correlates that information with measurement data for each bucketload of ore. Each time a bucketload of ore is excavated by the machine, a loading signal is delivered from indicator 121 to processor 124, which then records the previously-sampled GPS coordinate point from receiver 120. Next, the payload measurement system 123 measures pertinent data on that bucketload of ore, for example weight, between its excavation and dumping into a waiting truck. The payload data measured at 123 is correlated by processor 124 with the previously-stored loading position GPS coordinates, and the process is repeated for successive bucketloads of material until the truck has been loaded to the desired degree. Accordingly, for each truckload of ore, the site database stores precise position and ore grade information for each bucketload comprising the truck payload. As successive bucketloads are dumped into the truck, each load is calculated together with the other loads for that truck and an average is determined as to the overall truck payload, for example an average ore concentration measurement. With this information the operator or mine manager can direct the truckload of excavated ore to the most appropriate site, e.g., a processing area for high grade ore or a stockpile for marginal ore.

Figure 4:
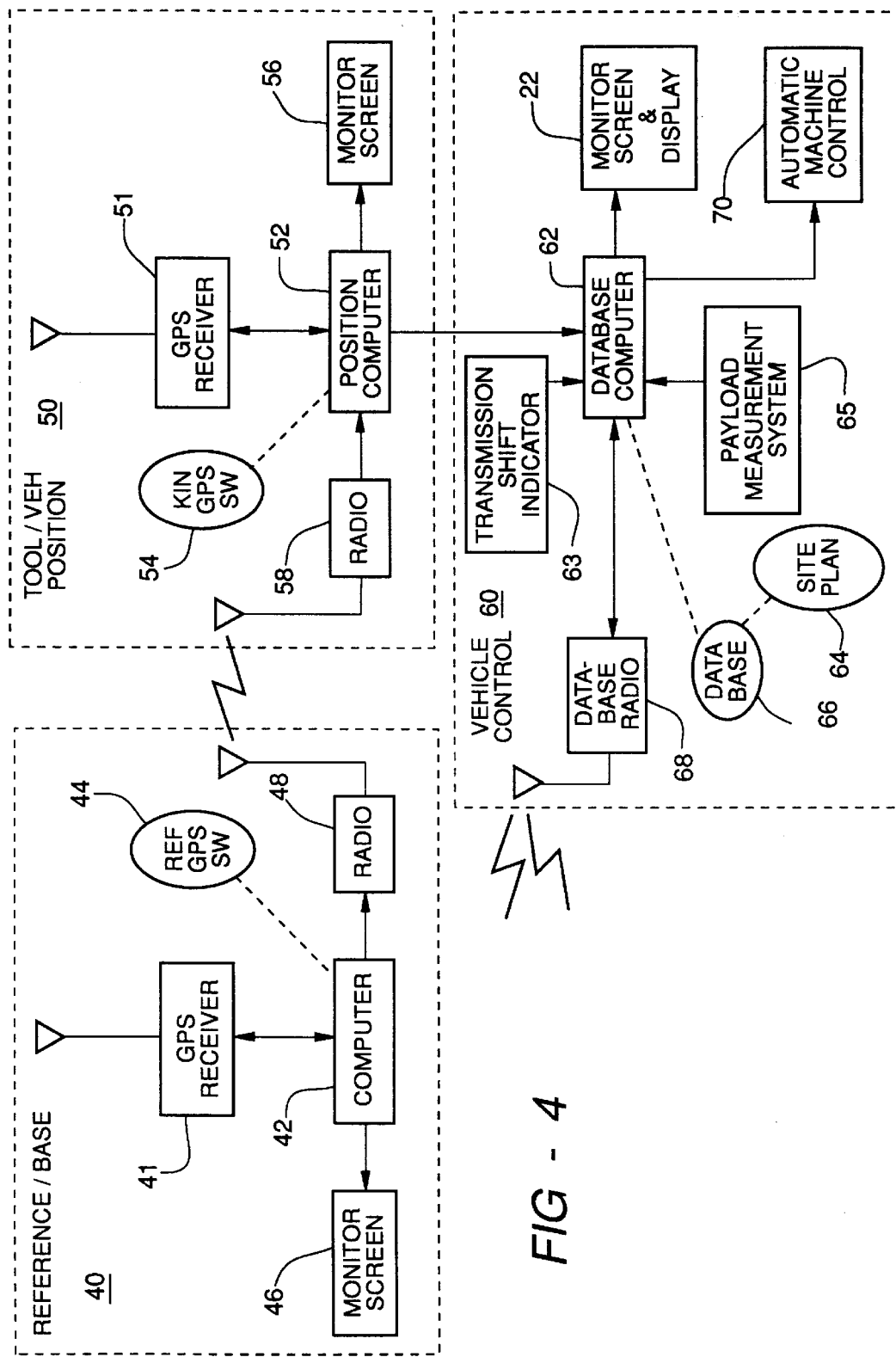
FIG. 4 is a schematic representation of an embodiment of the apparatus of FIG. 3.

Referring now to FIG. 4, a more detailed schematic of a system according to FIG. 3 is shown using kinematic GPS for position reference signals. A base reference module 40 and a position module 50 together determine the three-dimensional coordinates of the loading machine relative to the site, while an update/control module 60 converts this position information into real time representations of the site which can be used to accurately monitor and control the machine.

Base reference module 40 includes a stationary GPS receiver 41; a computer 42 receiving input from receiver 41; reference receiver GPS software 44, temporarily or permanently stored in the computer 42; a standard computer monitor screen 46; and a digital transceiver-type radio 48 connected to the computer and capable of transmitting a digital data stream. In the illustrative embodiment base receiver 41 is a high accuracy kinematic GPS receiver; computer 42 for example is a 486DX computer with a hard drive, 8 megabyte ram, two serial communication ports, a printer port, an external monitor port, and an external keyboard port; monitor screen 46 is a color display; and radio 48 is a commercially available digital data transceiver.

Position module 50 comprises a matching kinematic GPS receiver 51, a matching computer 52 receiving input from receiver 51, kinematic GPS software 54 stored permanently or temporarily in computer 52, a standard computer monitor screen 56 and a matching transceiver-type digital radio 58 which receives signals from radio 48 in base reference module 40. In the illustrative embodiment position module 50 is located on a loading machine to move with it over the work site.

Figures 4A, 14:
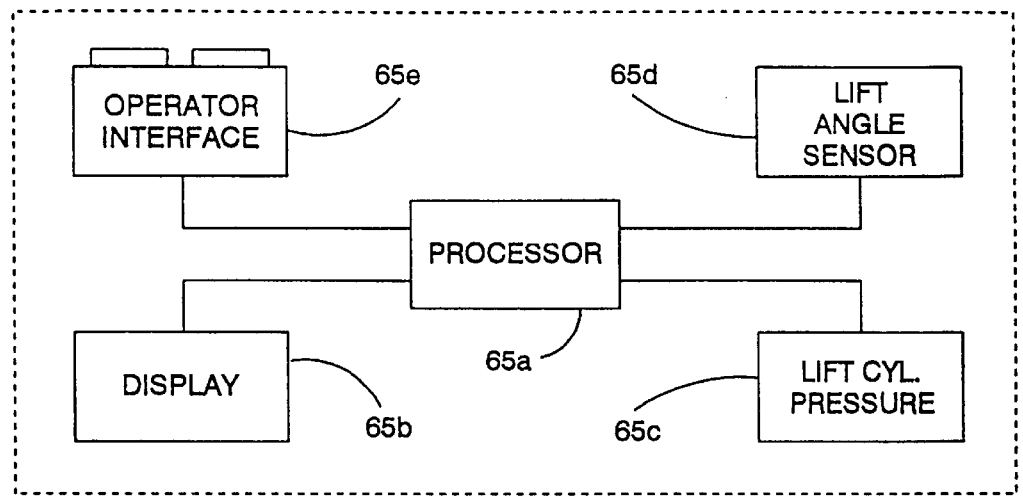

Update/control module 60, also carried on board the loading machine in the illustrated embodiment, includes an additional computer 62 receiving input from position module 50 via suitable serial port connection; one or more site models 64 digitally stored, for example by Flash RAM card downloaded into the computer memory; a dynamic database update module 66, also stored or loaded into the memory of computer 62; a color operator display screen 22 connected to the computer; a transmission shift indicator 63 connected to computer 62; and a payload monitoring device 65, shown in further detail in FIG. 4A including its own computer processor 65*a*, operator display 65*b*, a device to measure lift cylinder pressure 65*c*, a lift angle sensor 65*d*, and operator pushbuttons 65*e*.

Instead of, or in addition to, operator display 22, automatic machine controls 70 can be connected to the computer to receive signals which operate the machine in an automatic or semi-automatic manner in known fashion.

Module 60 further includes a transceiver-type digital radio 68, for example a low level spread spectrum radio, communicating with database computer 62 to supply it with position and production information broadcast from other machines (not shown). Radio 68 is also capable of transmitting the position and payload/production information from its own machine position module 50 and computer 62 to other machines or databases.

Although update/control module 60 is here shown mounted on the machine, some or all portions may be stationed remotely. For example, computer 62, site model(s) 64, dynamic database 66 and radio 68 could be connected by digital radio datalink to position module 50 and operator display 22 or machine control interface 70.

Base reference station 40 is fixed at a point of known three-dimensional coordinates relative to the work site. Through receiver 42 base reference station 40 receives position information from a GPS satellite constellation, using the reference GPS software 44 to derive an instantaneous error quantity or correction factor in known manner. This correction factor is broadcast from base station 40 to position station 50 on the compacting machine via radio link 48, 58. Alternately, raw data can be transmitted from base station 40 to position station 50 via the radio link, and processed by computer 52.

Machine-mounted receiver 51 receives position information from the satellite constellation, while the kinematic GPS software 54 combines the signal from receiver 51 and the correction factor from base reference 40 to determine the position of receiver 51 and the loading machine relative to base reference 40 and the work site within a few centimeters. This position information is thee-dimensional (e.g., easting, nording, and elevation) and is available on a point-by-point basis according to the sampling rate of the GPS system.

Referring to update/control module 60, once the digitized plans or models of the site have been loaded into computer 62, dynamic database 66 generates signals representative of the site model, for example the boundaries of different ore grade regions and the difference between the actual and desired site models, and displays this information graphically on operator display screen 22 relative to the site topography. Using the position information received from position module 50, the database 66 also generates a graphic icon of the loading machine superimposed on the site topography on display 22 corresponding to the actual position and direction of the machine on the site.

Because the sampling rate of the position module 50 results in a time/distance delay between position coordinate points as the loading machine moves over the site, the dynamic database 66 uses a differencing algorithm to determine and update in real-time the path of the machine.

In order to precisely monitor payload information on a bucketload and truck payload basis, shift indicator 63 delivers a load-indicating signal to computer 62. This signals computer 62 to store the GPS coordinate at the shift (loading) location for correlation to characteristics such as ore concentration at the loading position, and/or a payload measurement from payload monitor 65. The computer 62 determines which of the shift points are associated with obtaining a bucket load of material.

Figure 5:
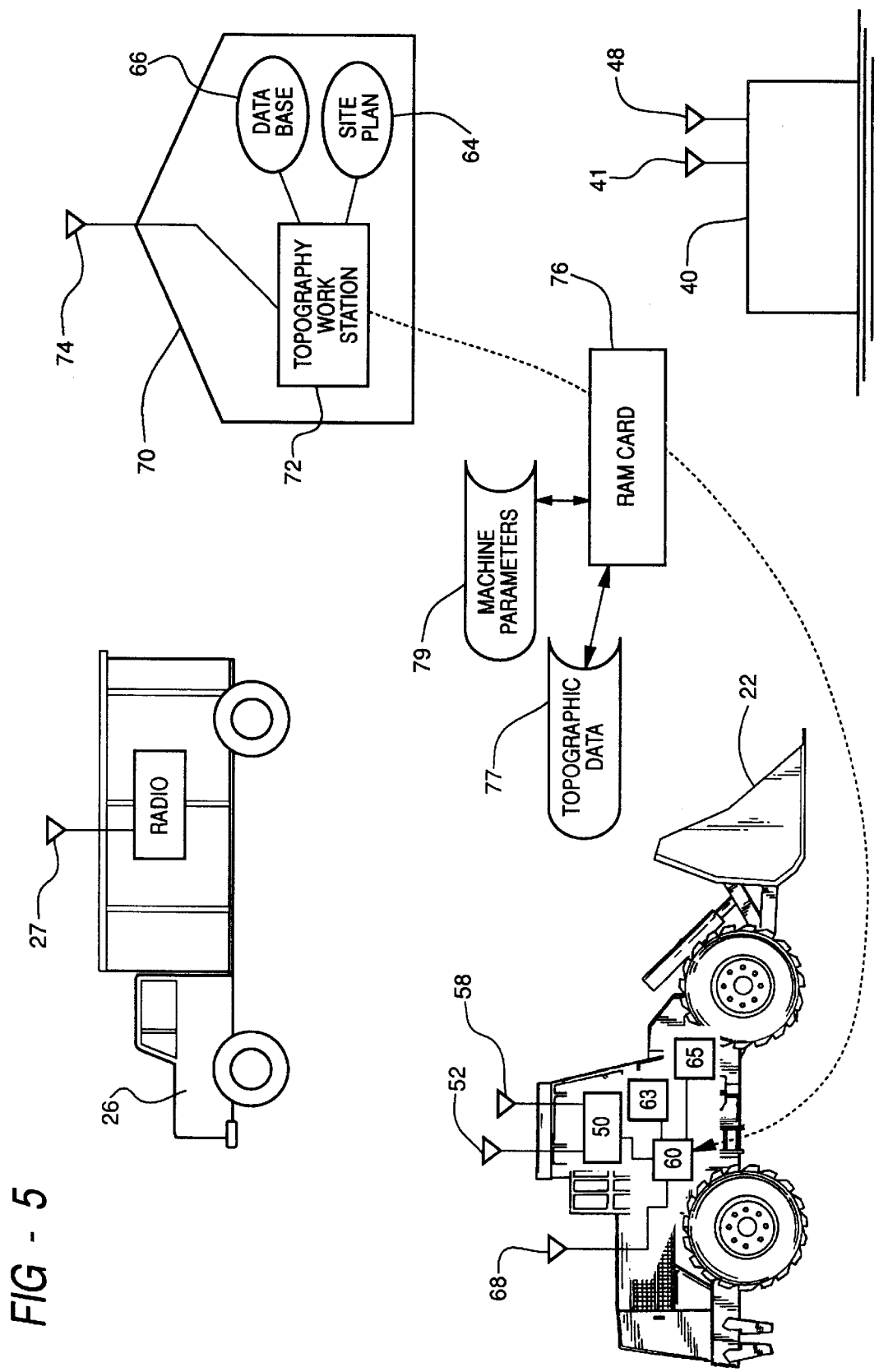
FIG. 5 is a schematic representation of the apparatus of FIG. 4 applied for a single loader operation coordinated with a transport truck and site management office.

Referring now to FIG. 5, the apparatus illustrated in FIG. 4 is shown as applied to an exemplary single loader operation coordinated with a transport truck and site management office on the mine site. A site manager's facility 71, located at or near the site 12, is provided with a topographic work station computer 72 including the dynamic database 66 described above and a digitized model of the site. The site model and machine parameters for loading machine 20 are loaded at facility 71 onto a Flash RAM card 76, which is then used to download the information to the dynamic database in module 60 on loading machine 20.

As machine 20 operates over site 12, excavating ore and loading it into nearby off-highway truck 26, the real time GPS coordinate position information generated by base reference 40 and position module 50 is supplied to the dynamic database in module 60. The dynamic database updates the current position of machine 20 relative to the site and the alterations to the site as the machine excavates ore. Loading position coordinates are recorded and correlated to payload information determined by measurement system 65 in response to signals from shift indicator 63. Machine position, site update and production data information is transmitted by digital radio 68 to radio 74 at facility 71 for updating the manager's database. Even if the site manager at 71 receives only machine position and production data such as average loading position and ore concentration, for example where computer 72 does not include a dynamically updated database 66, this information can be used to direct a truckload of newly-excavated ore to the appropriate location via standard dispatch radio procedures.

Figure 6:
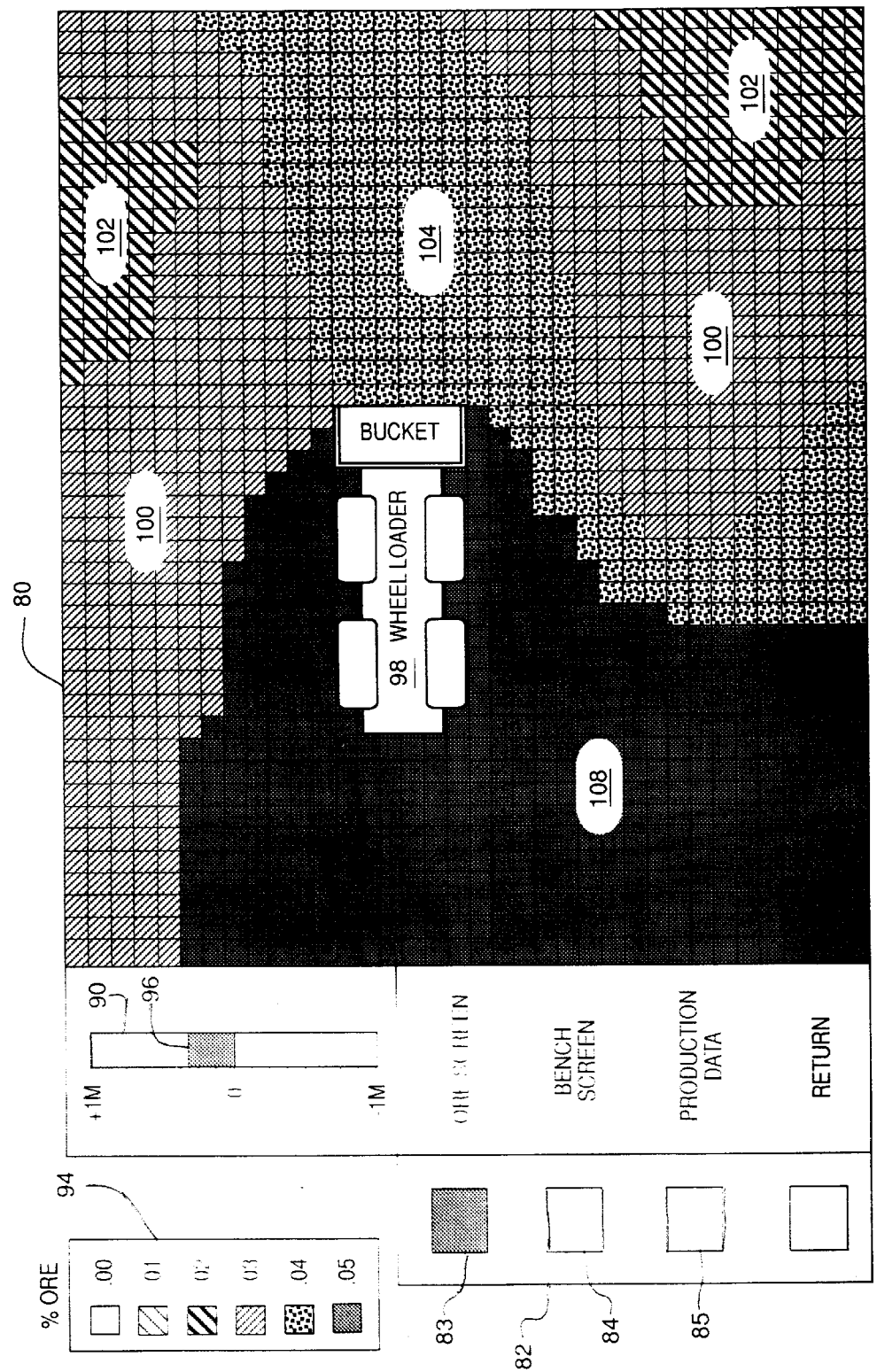
FIG. 6 is a representative schematic operator interface and display for ore concentration information.

FIG. 6 schematically illustrates a sample operator display 80 and interface 82 for an ore loading operation according to the present invention. Display 80 in FIG. 6 is an ore grade screen illustrating in cross-hatched regions 100,102,104 the (x,y) coordinate locations of the ore concentrations accessible to loader 20 from mining bench 108. In the presently illustrated embodiment of FIG. 6 three possible site display screens are illustrated, selected using buttons 83–85 on interface 82: an ore grade screen (FIG. 6); a bench screen (FIG. 7); and a production data screen (FIG. 8). These and other possible site displays, in two or three dimensions, will be apparent to those skilled in the art in view of the available software.

Display 80 in FIG. 6 also includes an elevation sidebar scale 90, in 0.1 meter increments for example, above and below a target excavation elevation. An icon 96 corresponding to the elevation of loader 20 moves up and down the sidebar scale 90 as machine position information is received from the GPS system. Display 80 in FIG. 6 can also include an ore grade key table 94, allowing the loader operator to immediately decipher the cross-hatching, coloring or other visual indicators on display 80 which can be used to identify the various ore grade regions.

The real time (x,y) position of loader 20 and bucket 22 on site 12 is represented on screen 80 with loader icon 98. The position of loader icon 98 on screen 80 relative to the site model is updated as real time position information is received from the GPS positioning system. In this fashion the loader operator has a convenient reference display of the machine's exact position relative to the site and more particularly the various ore regions 100,102,104 on the site. In the illustrated embodiment of FIG. 6 the ore concentration boundaries correspond to ore distribution in the (x,y) plane of mining bench 108. It is to be noted that while the z coordinate could be important in differentiating ore grade concentrations, typical mining operations will treat all ore obtainable over the z dimension of a given bench as the same.

Figure 7:
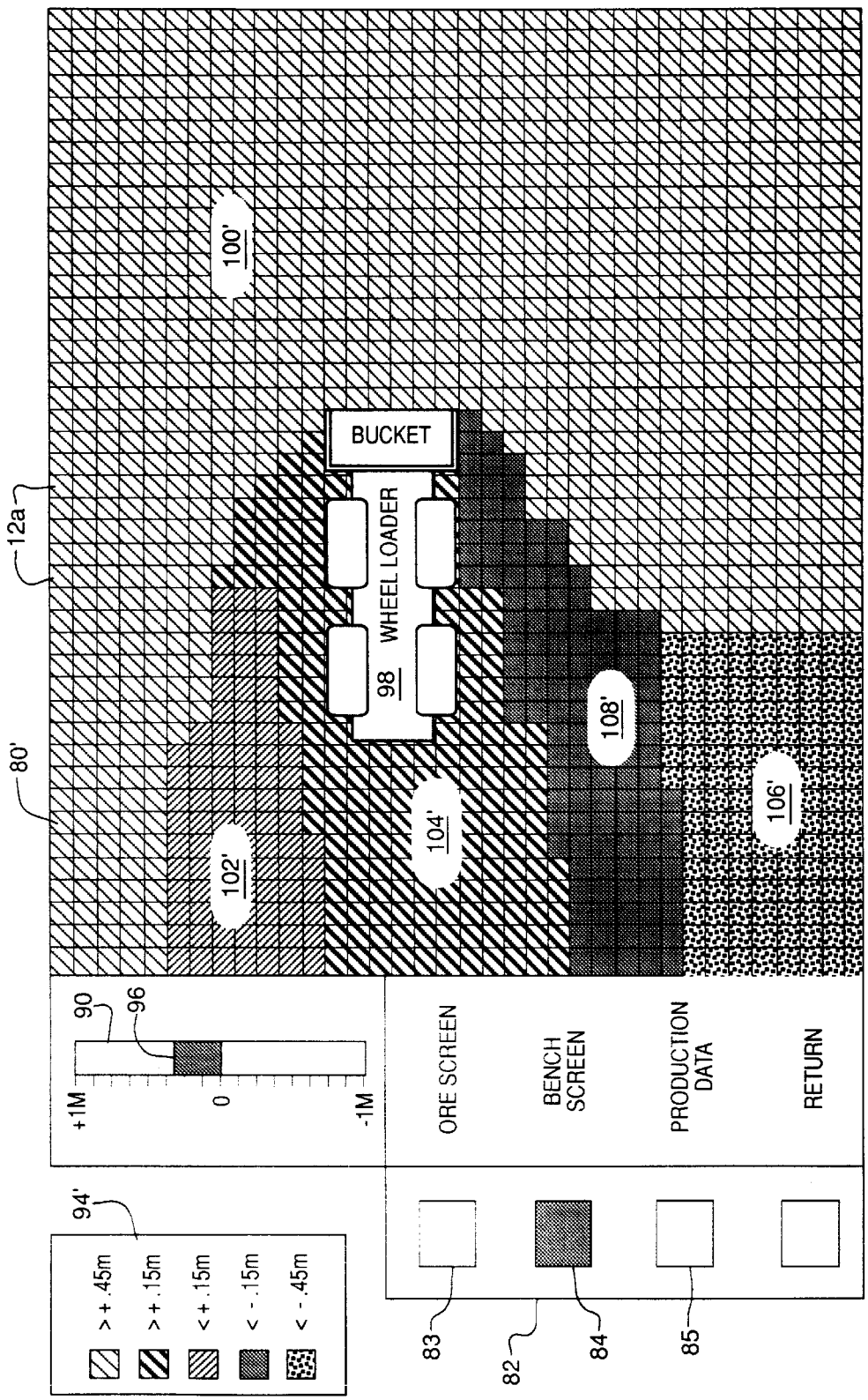
FIG. 7 is a representative schematic operator interface and display for bench information.
Figure 8:
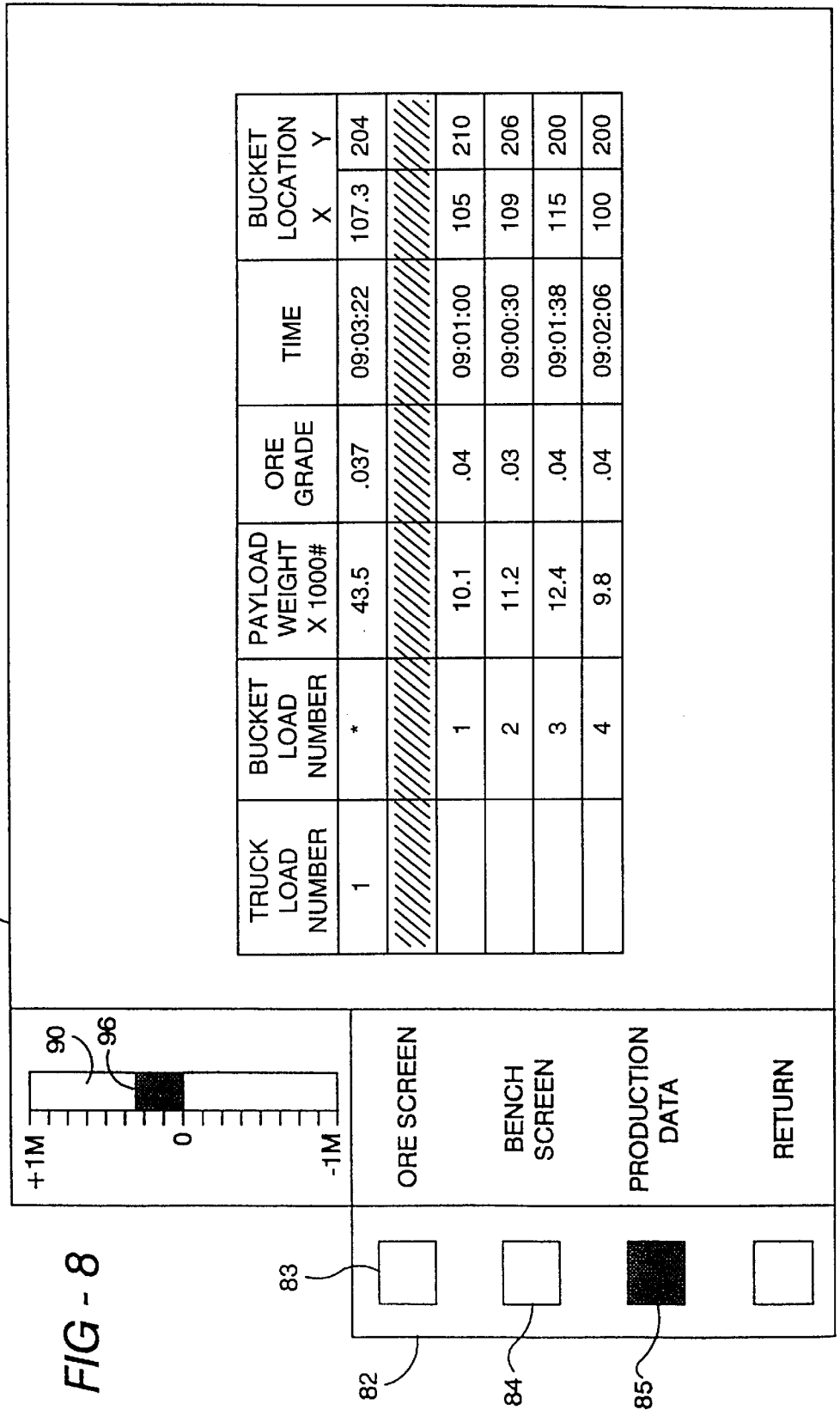
FIG. 8 is a representative schematic operator interface and display including loading production data in table form.

Referring to FIG. 7, an alternate bench screen display 80' provides the operator with real time machine position and site updates useful in maintaining proper bench elevation. In display 80' the site is modeled by bench elevation, with cross-hatching illustrating whether the actual site elevation at any given grid cell 12a is above, at or below the target bench elevation. In FIG. 7 bench elevation key table 94' correlates the hatch-coding of regions 100',102',104',106', 108' to the difference between the actual bench elevation and the target bench elevation. Elevation sidebar scale 90 with loader icon 96 gives additional graphical perspective on bench elevation at the position of loader 20. As loader 20 traverses the site, icon 96 on elevation scale 90 moves up and down in response to changing elevation in the GPS position coordinates measured by the GPS receiver on the loader.

The site model in display 80' remains unchanged until material is removed from or added to the surface to alter the bench elevation at that point. As material is added to or removed from the bench at a given point by bucket 22, the immediately following body of the wheel loader will rise or drop relative to the previous elevation measurement as its wheels follow the site surface. These changes in elevation effected and/or measured by loader 20 are read by the dynamic database, which then updates the site model and display 80' accordingly, for example by incrementing the hatch-coding of the appropriate grid cells up or down. The loader operator accordingly has a real time updated display of the bench elevation and the changes needed to bring the existing bench elevation into conformity with the target elevation.

Referring to FIG. 8, a third screen 80" displays summary production data for a truck payload comprising four bucketloads of ore. In the first row of information the table displays the truckload number, the truck payload weight, the average payload ore grade, the time at which the truck was filled, and the average (x,y) loading position coordinates. Successive rows provide individual bucketload information such as weight, ore grade, loading time, and the loading position in (x,y) coordinates. This production data can be useful to the loader operator, the truck driver and a mine manager, providing a concise summary and history of the truck payload so that it can be appropriately routed for processing or stockpiling.

Figure 9:
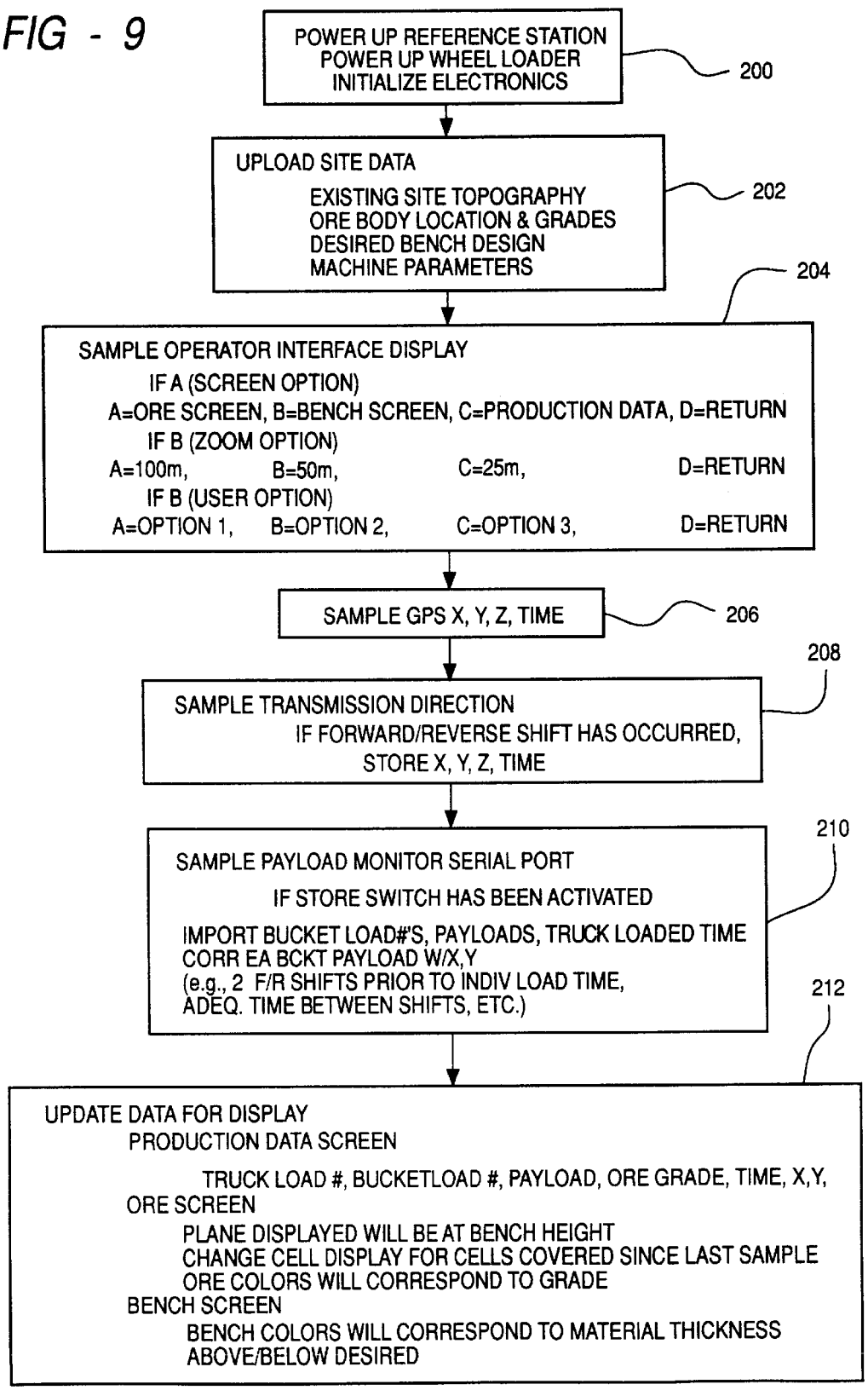
FIG. 9 is a flow chart representation of a method for monitoring the removal of material from a mine site according to the present invention.

FIG. 9 is a flowchart representation of a method for monitoring machine position and production data as illustrated in the display of FIG. 8. In block 200 the GPS reference station 40, wheel loader 20 and the electronics in their associated systems are powered up and initialized. In block 202 site model data including the existing site topography, ore body location and grades, target bench design, and the parameters of the loading machine are uploaded from the system memory. In block 204 the operator display 22 is initialized and the operator interface is sampled for the screen choices shown in FIGS. 6–8. For example, on the way to the designated excavation area for the day, the operator may switch to the bench screen of FIG. 7 to do bench maintenance prior to excavating. For excavation, the operator would switch to the ore screen of FIG. 6. After each truck payload is completed, the operator may select the production data screen of FIG. 8 for a summary. Other options can include a zoom feature to enlarge or decrease the portion of the site displayed on the screen. User-defined screen options are possible within the scope of the present invention, and can be incorporated as desired by those skilled in the art.

In block 206 the position information from the GPS system on the machine is sampled for coordinates (x,y,z, time). In block 208 the transmission direction is sampled from a transmission shift register generated in the database in response to transmission shift signals from the shift indicator 63. If a forward-neutral-reverse shift is detected as described below, the GPS (x,y,z,time) coordinate measured in block 206 is stored for correlation to information from the payload measurement system. In block 210 the payload monitor serial port from the payload measurement system is sampled to determine whether the "store" switch has been activated by the operator to indicate the completion of a truck payload. If the store switch has been activated, information from the payload measurement system is "imported" into the database. The truckload number is designated, and the measurements and loading times for the truck payload and its individual bucketloads are recorded. The payload information for each bucket is correlated to the (x,y) coordinates of the previous GPS reading, for example by matching a time stamp generated by the payload measurement system for each bucketload to the time coordinate of a recorded GPS loading position.

In block 212 the database information used for the display is updated for each screen. The production data screen is updated with the current truckload number, constituent bucketloads, average and individual payloads, ore grades, and (x,y,time) loading coordinates.

The ore screen, whose two-dimensional display is set in the illustrated embodiment at the bench elevation, is updated by changing the visual status of the grid cells traversed by the loading machine bucket 22 for ore removal. The bench screen grid cells in the path of the machine are visually updated where the elevation has been altered up or down since the last reading.

Referring to FIGS. 10A–10D, the operational steps of dynamic database 66 for updating the ore and bench screens of FIGS. 6 and 7 in real time are shown schematically, using methods for tracking the machine position and/or path and updating the site model accordingly. Similar methods for geography-altering operations such as earth contouring are disclosed in co-pending application U.S. Ser. No. 08/165, 126 filed Dec. 8, 1993, incorporated herein in full by reference. It will be apparent to those skilled in the art that such methods for machine position/path and site updates are adaptable to any site altering, contouring or excavating operation in which it is desired to determine the path of a portion of the machine or its tool traversing the grid cells of the site model.

The system starts at 300 from the computer's operating system. The graphics for the display screens are initialized at 302. The initial site database (e.g., digitized site plan, machine parameters) is read from a file in the program directory, and the site plan and actual and target topography are drawn on the display at step 304. The side bar elevation indicator 90 is set up at step 306, and the various serial communication routines between modules 40,50,60 (FIG. 4) are initialized at step 308. At step 310 the system checks for a user request to stop the system, for example at the end of the day, or for meal breaks or shift changes. The user request to terminate at step 310 can be entered with any known user-interface device, for example a computer keyboard or similar computer input device, communicating with computer 62.

The machine's three-dimensional position is next read at step 312 from the serial port connection between position module 50 and control/update module 60 in FIG. 3. At step 314 the machine's GPS position is converted to the coordinate system of the digitized site plans.

At step 318 the machine path is determined and updated in real time to indicate the portions of the site plan grid over which the machine has operated. In the illustrated ore and bench screen embodiments, the width of the machine path is equated to its geography-altering tool (bucket 22) as it passes over the site. An accurate determination of the grid elements over which bucket 22 passes is necessary to provide real time updates of the operator's position and work on the site. The size of the grid elements on the digitized site plan is fixed, and although the width of several grid elements can be matched evenly to the width of the operative portion of the machine (i.e., the bucket), the bucket will not always completely cover a particular grid element as the machine passes by. Even if the machine/tool width is an exact multiple of grid element width, it is rare that the machine would travel in a direction aligned with the grid elements so as to completely cover every element in its path.

Figure 10A:
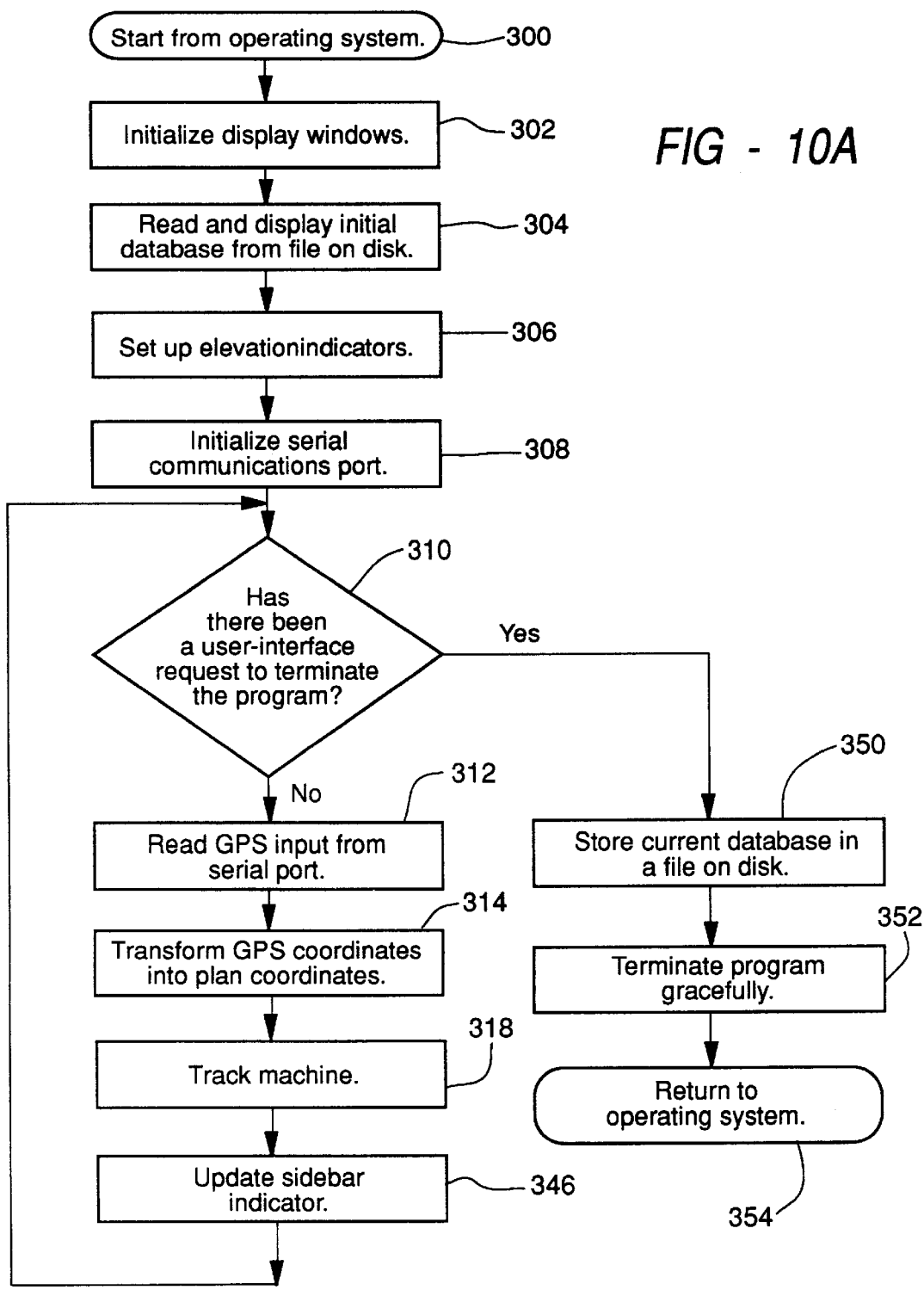
FIGS. 10A–10D are flow chart representations of a dynamic site database with machine path and site updating.
Figure 10B:
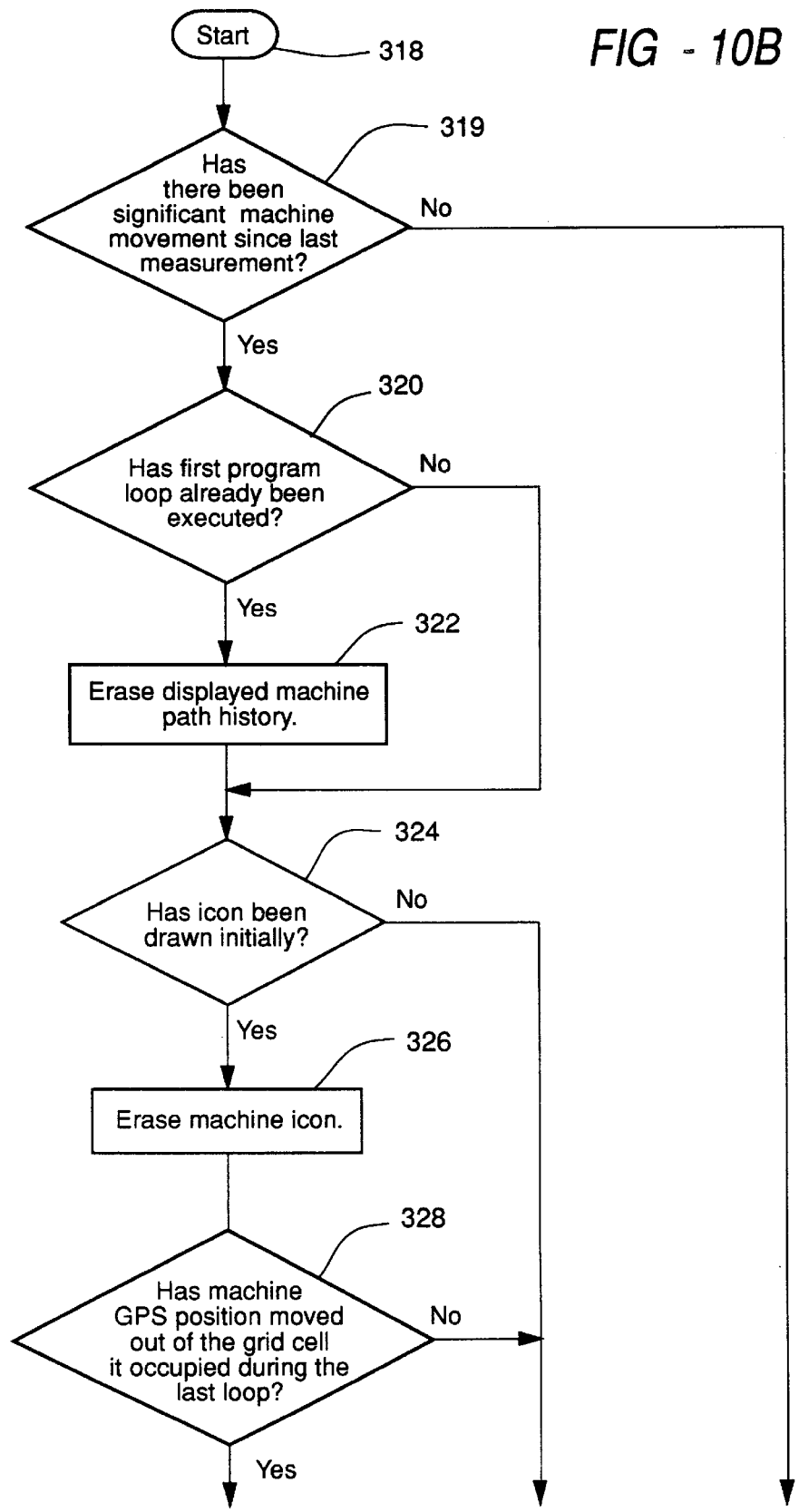
Figure 10C:
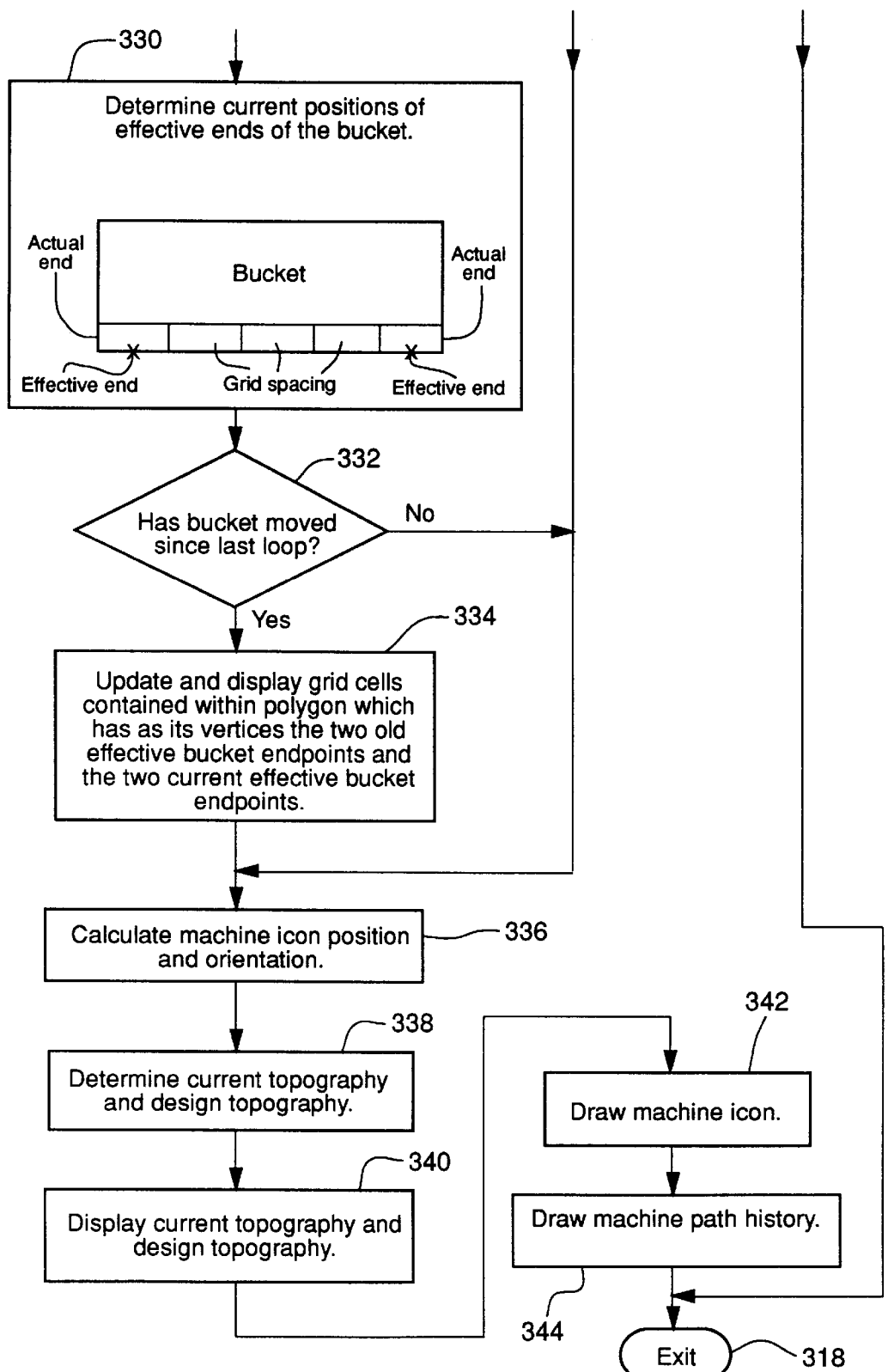

To remedy this problem, in FIGS. 10B–10C a subroutine for step 318 determines the path of the operative portion of the machine (here the bucket 22) relative to the site plan grid. At step 319 in FIG. 10B the module determines whether the machine-mounted receiver position has changed latitudinally or longitudinally (in the x or y directions in an [x, y, z] coordinate system) relative to the site. If yes, the system at step 320 determines whether this is the first system loop. If the present loop is not the first loop, the machine path determined and displayed from the previous loops is erased at step 322 for updating in the present loop. If the present loop is the first loop, step 322 is simply bypassed, as there is no machine path history to erase.

At step 324 the loader icon is initially drawn. If already drawn, the loader icon is erased from its previous position on the site model plan at step 326. At step 328 the system determines whether the machine's current position coordinates are outside the grid element the machine occupied in the last system loop.

If at step 328 the position of the machine has not changed, for example if the loader is parked or idling, the system proceeds to steps 336–344.

If at step 328 the position of the machine relative to the site plan grid has changed, the system proceeds to step 330 where it designates "effective" bucket ends inboard from the actual bucket ends. In the illustrated embodiment the effective bucket ends are recognized by the differencing algorithm as inboard from the actual ends a distance approximately one half the width of a grid element. For example, if the actual bucket 22 is 10.0 feet long, corresponding to five 2.0 ft. ×2.0 ft grid elements, the effective locations of the bucket ends are calculated at step 330 one foot inboard from each actual end. If the effective (non-actual) bucket ends contact or pass over any portion of a grid element on the digitized site model, that grid element is read and manipulated by the differencing algorithm as having been traversed by the machine, since in actuality at least one half of that grid element was actually passed over by the bucket. Of course, the amount of bucket end offset can vary depending on the size of the grid elements and the desired margin of error in determining whether the bucket has passed over a grid element. For example, it is possible to set the effective tool parameters equal to the actual tool parameters, although the smaller effective parameters of the illustrated embodiment are preferred.

It will be understood that this tool-locating method is applicable to any geography altering operation in which it is desired to determine the path of a continuous portion of the machine or its tool traversing the grid elements of the site model.

At step 332 the system determines whether the bucket has moved since the last system loop. If the bucket has moved, the system proceeds to step 334 to determine the real-time path of the bucket over the site plan grid in a manner described in further detail below with reference to FIG. 10D. If at step 332 the bucket has not moved since the last system loop, the system bypasses step 334. At step 33G the system uses the above-determined machine path information to calculate the machine icon position and orientation. At step 338 this information is used to determine the current or actual bench elevation relative to the desired elevation. At step 340 this information is displayed on the operator display. At step 342 the system next draws the machine icon on the display 80, and at step 344 the machine path history previously erased is redrawn to reflect the most recent machine movement and site alterations in the path of the machine.

Referring back to step 319 of the subroutine for step 318, if there has been no significant change in the machine's position since the last measurement, the machine position, tracking and updating steps 320–344 are bypassed, and the system proceeds from the subroutine of step 318 in FIG. 10A to step 346.

At steps 346, 348 in FIG. 10A, the sidebar elevation indicator on the display is updated, and the system completes its loop and returns to step 310.

At step 310 the option is available to the operator to stop the system as described above, for example at the end of the day or at lunchtime. If the operator chooses at step 310 to stop the system, the system proceeds to step 350 where the current database is stored in a file on a suitable digital storage medium in the system computer, for example, a permanent or removable disk. At step 352 the operations of the differencing module are terminated, and at step 354 the operator is returned to the computer operating system. If the operator does not quit the system, it returns to step 312 where subsequent position readings are taken from the serial port connected to position module 50 and receiver 18, and the system loop repeats itself.

Figure 10D:
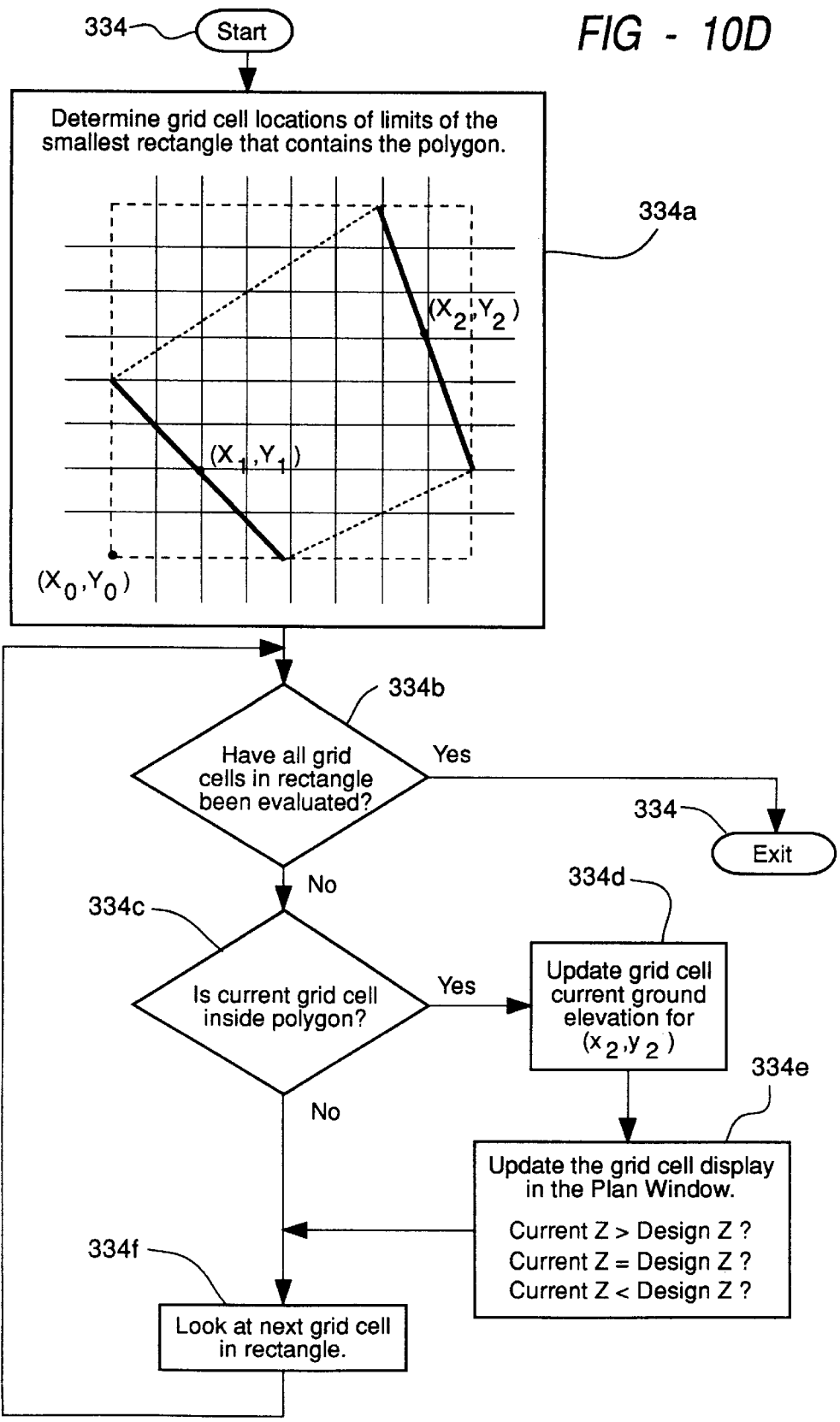

The subroutine for step 334 in FIG. 10C which updates the machine path and current site plan is shown in further detail in FIG. 10D. While the algorithm of step 330 compensates for the lack of complete correspondence between the width of the machine or tool and the number of grid elements completely traversed by the machine or tool, the distance and direction changes which the machine/tool makes between GPS position readings results in a loss of real time update information over a portion of the machine's travel. This is particularly acute where machine travel speed is high relative to the grid elements of the site plan. For example, where the grid elements are one meter square and the sampling rate of the position system is one coordinate sample per second, a machine traveling at 18 kilometers per hour travels approximately five meters or five grid squares between position samplings. Accordingly, there is no real time information with respect to at least the intermediate three of the five grid squares covered by the machine.

To solve this problem a "fill in the polygon" algorithm is used in step 334 to estimate the path traversed by the machine between coordinate samplings. In FIG. 10D the algorithm at step 334a locates a rectangle on the site plan grid surface defined by the effective ends of the loader bucket at positions $(x_1, y_1)$ and $(x_2, Y_2)$ and coordinate position $(x_0, y_0)$. At steps 334b, 334c and 334f a search algorithm searches within the rectangle's borders for those grid elements within a polygon defined between the two bucket positions; i.e., those grid elements traversed by the bucket between its effective ends.

At steps 334d and 334e these recently-traversed grid elements are "painted" shaded, marked or otherwise updated to inform the operator whether he is above, below or on the target elevation for those grid elements. In step 334d the ground elevation or z-axis coordinate of the grid elements is updated at coordinate $(x_2, Y_2)$ In step 334e a current elevation greater than the target elevation results in the grid elements being, for example, colored red. A current elevation equal to the target elevation results in the grid elements being, for example, colored yellow. A current elevation less than the target elevation results in the grid elements being, for example, colored blue. On the operator display 22 the update appears as the just-traversed swath of grid elements behind the machine/ tool icon 82, colored or otherwise visually updated to indicate whether the cut or contour is at, above or below the target contour; an example is shown by the differently-hatched regions of display 80' in FIG. 7. If the target contour has not been matched in that region, the operator can backtrack or correct it on the next pass. The painted swath traversed by the loader icon will remain on the operator display screen 22 until it is altered sufficiently in subsequent passes to warrant a color change or similar visual update, e.g., until the elevation coordinates of the machine on the actual site come into closer conformity with the elevation coordinates for the desired site model on those grid elements.

In the ore screen embodiment of FIG. 6, the above illustrated machine path tracking and site update method can be used to update the ore-containing regions of the site whenever bucket 22 traverses such a region. For example, in ore-loading operations, the wheel loader typically engages the ore with the bucket down, such that any portion of the ore region traversed by the bucket can be assumed to have been cleared and the "target" topography achieved. In this case the grid cells in the ore region traversed by bucket 22 could be updated with a simple "excavated" visual indication; it may not be necessary to record the actual updated site elevation in the path of the bucket in order to update the site database and display.

In the bench screen embodiment of FIG. 7, it is desirable to update the grid cells in the path of the machine based on the elevation changes effected by the bucket. In this case the target topography is the target elevation of the bench at each grid cell.

Referring to FIG. 11, a method for tracking the paths of two or more machines, and updating the site database accordingly, is similar to that shown in FIG. 10A. However, at step 313 the GPS input from a second machine is received by the database computer 62 on a first machine from the serial port connection with radio 68 (FIG. 4). Using this information the program executes a machine path tracking loop as described above in FIGS. 10B–10D for the second machine at step 319. In this manner a common database of shared machine position and site update information can be generated to coordinate the operations of multiple machines on the site. Further information on multiple machine coordination using a common, dynamically-updated database is found in co-pending application Ser. No. 08/228,837, referenced above.

Referring to FIGS. 12–14, a method for generating load indication signals based on the loader's direction of travel is shown schematically.

As described above, signals indicating a completed loading operation can be generated by transmission shift switches, for example two switches mounted on a known wheel loader transmission illustrated schematically in FIG. 12A with one switch connected for example in the back-up alarm circuit and the other in the transmission neutralizer circuit. One switch is activated when the transmission is shifted in reverse, and the other switch is activated when the transmission is shifted into neutral. Referring to FIG. 12, an algorithm in the database samples the neutral and reverse switches and, depending on their present and previous states (on or off) establishes a shift register which samples the GPS system (x,y,time) coordinates in response to a complete forward-neutral-reverse shift. In the illustrated embodiment, during a loading operation as illustrated in FIG. 1, alternate forward-neutral-reverse shifts represent loading and dumping operations. For a sequence of shifting as illustrated by points A–K in FIG. 1, switch data and GPS position sampling is illustrated in the tables of FIGS. 13A-13B generated by the algorithm of FIG. 12. Each time the "output" column registers a "1" GPS coordinate information is sampled and stored. Only complete forward-neutral-reverse shifts trigger the GPS data sampling.

As illustrated in FIG. 1 and FIG. 13D for positions G,H, the loader operator will occasionally make a temporary forward-neutral-reverse shift during the loading phase to ensure a full bucketload, backing up briefly for a second run at the ore pile. This activity will result two GPS data samplings when perhaps only the latter sampling accurately reflects the bucket loading position, in FIG. 1 and FIG. 13B at point H. To prevent false readings caused by such shifting, the database automatically excludes the earlier, temporary shift at point G if it falls outside a predetermined timing window before the next forward-neutral-reverse shift, for example five seconds. In addition to a predetermined timing window, a predetermined distance window can also be set, for example 5 feet. In this manner, if multiple, successive, forward-neutral-reverse shifts occur within too short a time and/or distance, it can be determined which shift transitions are associated with the same loading or dumping portion of the cycle. The timing and distance windows can be set as desired to eliminate such false data samplings.

Referring to FIG. 14, the data from points A–H is summarized, with the data taken at point G deleted or ignored as a false shift. Data points are alternatingly designated as either a loading operation or a dumping operation. Each bucketload is correlated to the ore grade or concentration at the recorded loading position coordinates. This data can be further summarized as shown in the display of FIG. 8 for viewing by the operator or mine manager.

Each time the waiting truck has been filled, for example by the four bucketloads for which data is recorded in FIG. 14, the operator acknowledges a completed truckload by pressing the "store" button in the previously described payload information system. Average payload information for that truckload can then be calculated as illustrated in FIG. 8.

It will be apparent from the foregoing that the illustrative method and apparatus for monitoring machine position and production data for a mining operation is easily adapted for other earth-removing or earth-contouring type operations and machines.

Using a suitable two-way digital data link and a common, dynamically-updated database as described above, the invention can be applied to two or more loaders operating in tandem to load a single truck. By providing the operator of each loader with production data information generated by the other during the loading operation, each can determine the total amount of material already dumped into the truck and the amount needed to top off the truck payload.

It may be desirable to monitor in real time the location and path of truck 26 as it hauls the completed truckload to a processing station or reclamation stockpile. This can be accomplished by providing the truck with its own position module 50 as shown, for example, in FIG. 4, and the ability to transmit digital data corresponding to its current GPS-determined position to a database on a loading machine or a site management facility.

The method and apparatus of the invention is not limited to wheel-type ore loaders. For example, cable shovels can be similarly equipped to monitor payload information. Because cable shovels are less mobile than wheel-loaders, and since the shovel-type tool on a cable shovel is more mobile relative to the body of the machine than the bucket or blade on a wheel loader or tractor, the shovel itself may be treated as the "mobile machine" and provided with its own GPS receiver or receivers to provide precise position information for each shovel load from the site.

These and other implementations of the inventive method and apparatus illustrated above will be apparent to those skilled in the art. The foregoing illustrative embodiment is not intended to be limiting, since many applications and embodiments of the present invention will lie within the scope of the appended claims.

We claim:

1. Apparatus for monitoring in real time the removal of material from a land site by a mobile machine, comprising:

digital data storage and retrieval means for storing a site model, the site model including a model of the material to be removed and subdivided into regions of differentiating characteristics;

means for generating digital signals representing in real time the instantaneous position of at least a portion of the machine relative to the site as it traverses the site;

means for sensing the removal of material from the site by the mobile machine and generating a corresponding loading signal;

means for recording an instantaneous loading position for the mobile machine relative to the site in response to the loading signal; and means for correlating the characteristics of the site material at the instantaneous loading position to the material removed by the machine.

2. Apparatus as defined in claim 1, further including means for measuring a discrete load of material as it is removed from the site by the mobile machine.

3. Apparatus as defined in claim 2, further including means for correlating the measured load to the instantaneous loading position.

4. Apparatus as defined in claim 3, further including means for recording measurements for a plurality of discrete loads comprising a payload, and for determining a payload measurement.

5. Apparatus as defined in claim 4, further including means for determining an average for the site material characteristics of the payload.

6. Apparatus as defined in claim 5, wherein the means for sensing the removal of material from the site comprise transmission shift sensor means.

7. Apparatus as defined in claim 1, further including means for recording a plurality of loading positions corresponding to a plurality of discrete loads of material removed from the site comprising a payload, and for determining an average loading position for the payload.

8. Apparatus as defined in claim 7, further including means for correlating the characteristics of the site material at the average loading position to the payload of material removed.

9. Apparatus as defined in claim 1, wherein the means for generating position signals is carried on the machine.

10. Apparatus as defined in claim 9, wherein the machine includes an operative tool portion movable relative to the machine for removing material from the site, and the means for generating position signals is located on the operative tool portion.

11. Apparatus as defined in claim 1, wherein the means for generating position signals include a GPS receiver.

12. Apparatus as defined in claim 1, wherein the means for recording the loading position are located on the mobile machine, and further including means for transmitting the loading position information to a location off the machine.

13. Apparatus as defined in claim 1, wherein the mobile machine comprises a wheel-type ore loader.

14. Apparatus as defined in claim 1, further including means for receiving the three-dimensional position signals and for displaying the position of the machine relative to the site in real time.

15. Apparatus as defined in claim 14, wherein the display means are located on the machine.

16. Apparatus as defined in claim 1, further including means for updating the site model in real time as material is removed by the machine.

17. Apparatus as defined in claim 16, wherein the site model stored in the digital data storage and retrieval means includes a first site model representing the desired geography of the site and a second site model representing the actual geography of the site, and further including means for determining the difference between the first and second site models in real time and for generating signals for directing the operation of the machine in accordance with the difference to bring the second model into conformity with the first model.

18. Apparatus as defined in claim 1, further including transport means for receiving the material removed by the mobile machine and transporting the material to a remote location, and means for correlating the material removed to the transport means.

19. Apparatus for monitoring in real time the removal of material from a land site by a mobile machine, comprising:
digital data storage and retrieval means for storing a site model, the site model including a model of the material to be removed subdivided into regions of differentiating characteristics;
means for generating digital signals representing in real time the instantaneous position of at least a portion of the mobile machine relative to the site;
means for sensing the removal of a discrete load of material from the site by the mobile machine and for generating a corresponding loading signal;
means for recording an instantaneous loading position for the mobile machine relative to the site in response to the loading signal; and
means for measuring the discrete load of material removed and for correlating the measured load to the instantaneous loading position and the characteristics of the site material at the instantaneous loading position.

20. Apparatus as defined in claim 19, further including means for recording a plurality of loading positions corresponding to a plurality of discrete loads of material removed from the site comprising a payload, and for determining the average loading position for the payload.

21. Apparatus as defined in claim 19, further including means for measuring the weight of a plurality of discrete loads of material removed from the site comprising a payload, and for determining an average for the material characteristics of the payload based on the material characteristics for each discrete load.

22. Apparatus as defined in claim 19, wherein the means for sensing material removal comprise transmission shift sensor means.

23. Apparatus as defined in claim 19, wherein the means for generating position signals is carried on the machine.

24. Apparatus as defined in claim 23, wherein the machine includes an operative tool portion movable relative to the machine for removing material from the site, and the means for generating position signals is located on the operative tool portion.

25. Apparatus as defined in claim 19, wherein the means for generating position signals include a GPS receiver.

26. Apparatus as defined in claim 19, wherein the means for measuring the discrete load of material removed and for correlating the measured load to the instantaneous loading position are located on the machine, and further including means for transmitting the load position and measurement information off the machine.

27. Apparatus as defined in claim 19, wherein the machine is a wheel-type ore loader.

28. Apparatus as defined in claim 19, further including means for receiving the position signals and for displaying the position of the machine relative to the site to an operator.

29. Apparatus as defined in claim 28, wherein the display means is located on the machine.

30. Apparatus as defined in claim 19, further including means for updating the site model in real time as material is removed by the machine.

31. Apparatus as defined in claim 30, wherein the site model includes a first site model of the desired site geography and a second model of the actual site geography, and further including means for determining the difference between the first and second site models in real time and generating signals to direct the operation of the machine in accordance with the difference to bring the second model into conformity with the first model.

32. Apparatus as defined in claim 19, further including transport means for receiving the material removed by the mobile machine and transporting the material to a remote location, and means for correlating the material removed to the transport means.

33. Apparatus for monitoring in real time the removal of material from a mine or similar site by a mobile machine, and for directing the operation of the machine, comprising:
digital data storage and retrieval means for storing a site model of the material to be removed, subdivided into regions of differentiating characteristics;

means for generating digital signals representing in real time the instantaneous position relative to the site of at least a portion of the machine as it traverses the site;

means for receiving the position signals and for displaying the position of the mobile machine relative to the site in real time;

means for sensing the removal of a discrete load of material from the site by the mobile machine and for generating a corresponding loading signal;

means for recording the instantaneous three-dimensional loading position of the mobile machine relative to the site in response to the loading signal;

means for correlating each discrete load of material removed with the instantaneous loading position and the characteristics of the site material corresponding to the loading position; and dynamic database means communicating with the digital data storage and retrieval means and the means for generating position signals, the dynamic database means monitoring the path of the machine relative to the site in real time and updating the site model in real time in response to the monitored path of the machine as it traverses the site.

34. A method for monitoring in real time the removal of material from a land site by a mobile machine, comprising the steps of:

storing a site model in digital data storage and retrieval means;

generating digital signals representing in real time the instantaneous position of at least a portion of the machine as it traverses the site;

sensing the removal of material from the site by the mobile machine and generating a corresponding loading signal; and recording an instantaneous loading position for the mobile machine relative to the site in response to the loading signal, wherein the site model includes a model of the material to be removed and subdivided into regions of differentiating characteristics, further including the step of correlating the characteristics of the site material at the instantaneous loading position to the material removed by the machine.

35. A method as defined in claim 34, further including the step of measuring a discrete load of material as it is removed from the site by the mobile machine.

36. A method as defined in claim 35, further including the step of correlating the measured load to the instantaneous loading position.

37. A method as defined in claim 36, further including the step of recording measurements for a plurality of discrete loads comprising a payload, and determining a payload measurement.

38. A method as defined in claim 37, further including the step of determining an average for the site material characteristics of the payload.

39. A method as defined in claim 38, wherein the step of sensing the removal of material from the site includes the step of sensing a transmission shift.

40. A method as defined in claim 34, further including the step of recording a plurality of loading positions corresponding to a plurality of discrete loads of material removed from the site comprising a payload, and determining an average loading position for the payload.

41. A method as defined in claim 40, further including the step of correlating the characteristics of the site material at the average loading position to the payload of material removed.

42. A method as defined in claim 34, wherein the position signals are generated by means carried on the machine.

43. A method as defined in claim 42, wherein the machine includes an operative tool portion movable relative to the machine for removing material from the site, and the means for generating position signals is located on the operative tool portion.

44. A method as defined in claim 34, wherein the position signals are generated by a GPS receiver.

45. A method as defined in claim 34, wherein the step of recording the loading position is carried out by means located on the mobile machine, and further including the step of transmitting the loading position information to a location off the machine.

46. A method as defined in claim 34, wherein the mobile machine comprises a wheel-type ore loader.

47. A method as defined in claim 34, further including the step of receiving the three-dimensional position signals and displaying the position of the machine relative to the site in real time.

48. A method as defined in claim 47, wherein the position of the machine is displayed by means located on the machine.

49. A method as defined in claim 34, further including the step of updating the site model in real time as material is removed by the machine.

50. A method as defined in claim 49 wherein the site model stored in the digital data storage and retrieval means includes a first site model representing the desired geography of the site and a second site model representing the actual geography of the site, and further including the step of determining the difference between the first and second site models in real time and generating signals for directing the operation of the machine in accordance with the difference to bring the second model into conformity with the first model.

51. A method as defined in claim 34, further including the step of transporting the material removed by the mobile machine to a remote location with transport means, and correlating the material removed to the transport means.

52. A method for monitoring in real time the removal of material from a land site by a mobile machine, comprising the steps of:

storing a site model in digital data storage and retrieval means, the site model including a model of the material to be removed subdivided into regions of differentiating characteristics;

generating digital signals representing in real time the instantaneous position in thee-dimensional space of at least a portion of the mobile machine relative to the site;

sensing the removal of a discrete load of material from the site by the mobile machine and generating a corresponding loading signal;

recording an instantaneous loading position for the mobile machine relative to the site in response to the loading signal; and measuring the discrete load of material removed and correlating the measured load to the instantaneous loading position and the characteristics of the site material at the instantaneous loading position.

53. A method as defined in claim 52, further including the step of recording a plurality of loading positions corresponding to a plurality of discrete loads of material removed from the site comprising a payload, and determining the average loading position for the payload.

54. A method as defined in claim 52, further including the step of measuring the weight of a plurality of discrete loads of material removed from the site comprising a payload, and determining an average for the material characteristics of the payload based on the material characteristics for each discrete load.

55. A method as defined in claim 52, wherein the step of sensing material removal includes the step of sensing a transmission shift.

56. A method as defined in claim 52, wherein the step of generating position signals is carried out by means located on the machine.

57. A method as defined in claim 56, wherein the machine includes an operative tool portion movable relative to the machine for removing material from the site, and the means for generating position signals is located on the operative tool portion.

58. A method as defined in claim 52, wherein the position signals are generated by a GPS receiver.

59. A method as defined in claim 52, wherein the step of measuring the discrete load of material removed and correlating the measured load to the instantaneous loading position is carried out by means located on the machine, and further including the step of transmitting the load position and measurement information off the machine.

60. A method as defined in claim 52, wherein the machine is a wheel-type ore loader.

61. A method as defined in claim 52, further including the step of receiving the position signals and displaying the position of the machine relative to the site to an operator.

62. A method as defined in claim 61, wherein the position of the machine is displayed by means located on the machine.

63. A method as defined in claim 52, further including the step of updating the site model in real time as material is removed by the machine.

64. A method as defined in claim 63, wherein the site model includes a first site model of the desired site geography and a second model of the actual site geography, and further including the step of determining the difference between the first and second site models in real time and generating signals to direct the operation of the machine in accordance with the difference to bring the second model into conformity with the first model.

65. A method as defined in claim 52, further including the step of receiving the material removed by the mobile machine and transporting the material to a remote location with transport means, and correlating the material removed to the transport means.

66. A method for monitoring in real time the removal of material from a mine or similar site by a mobile machine, and for directing operation of the machine, comprising the steps of:

storing a site model of the material to be removed, subdivided in to regions of differentiating characteristics in digital data storage and retrieval means;

generating digital signals representing in real time the instantaneous position in three-dimensional space of at least a portion of the machine relative to the site as it traverses the site;

sensing the removal of a discrete load of material from the site by the mobile machine and generating a corresponding loading signal;

recording the instantaneous three-dimensional loading position of the mobile machine relative to the site in response to the loading signal;

correlating each discrete load of material removed with the instantaneous loading position and the characteristics of the sire material corresponding to the loading position; and providing dynamic database means communicating with the digital data storage and retrieval means and the means for generating position signals, the dynamic database means monitoring the path of the machine relative to the site in real time and updating the site model in real time in response to the monitored path of the machine as it traverses the site;

measuring the discrete load of material removed and correlating the measured load to the instantaneous loading position and the characteristics of the site material at the instantaneous loading position.

* * * * *